Feb. 19, 1957  L. C. WILLIAMS  2,781,842
PAPER TRIMMING AND CUTTING MACHINE
Filed Sept. 5, 1951  6 Sheets-Sheet 1

INVENTOR.
Leo C. Williams
BY
Dale A. Bauer
ATTORNEY.

Feb. 19, 1957  L. C. WILLIAMS  2,781,842
PAPER TRIMMING AND CUTTING MACHINE
Filed Sept. 5, 1951  6 Sheets-Sheet 2
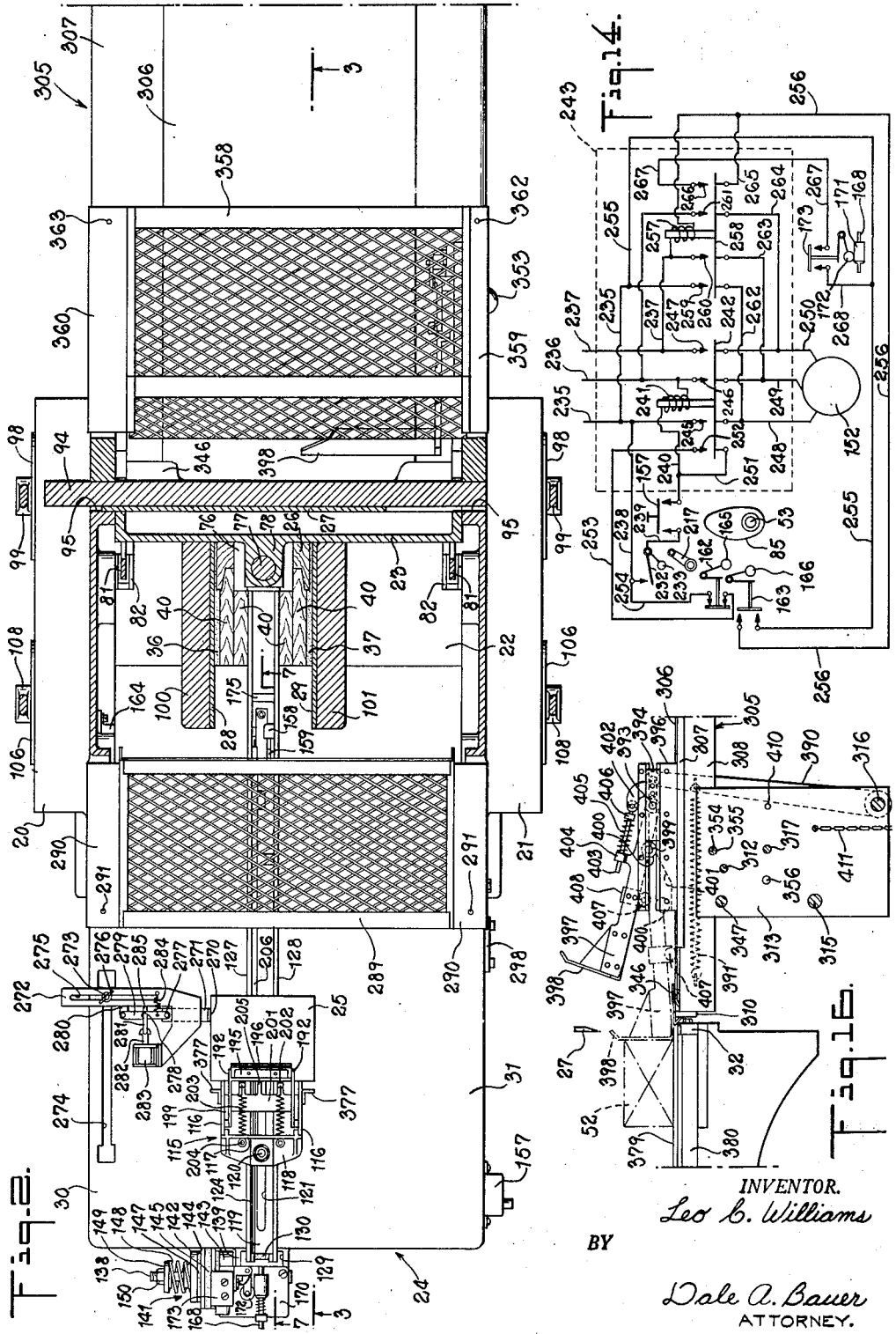
INVENTOR.
Leo C. Williams
BY
Dale A. Bauer
ATTORNEY.

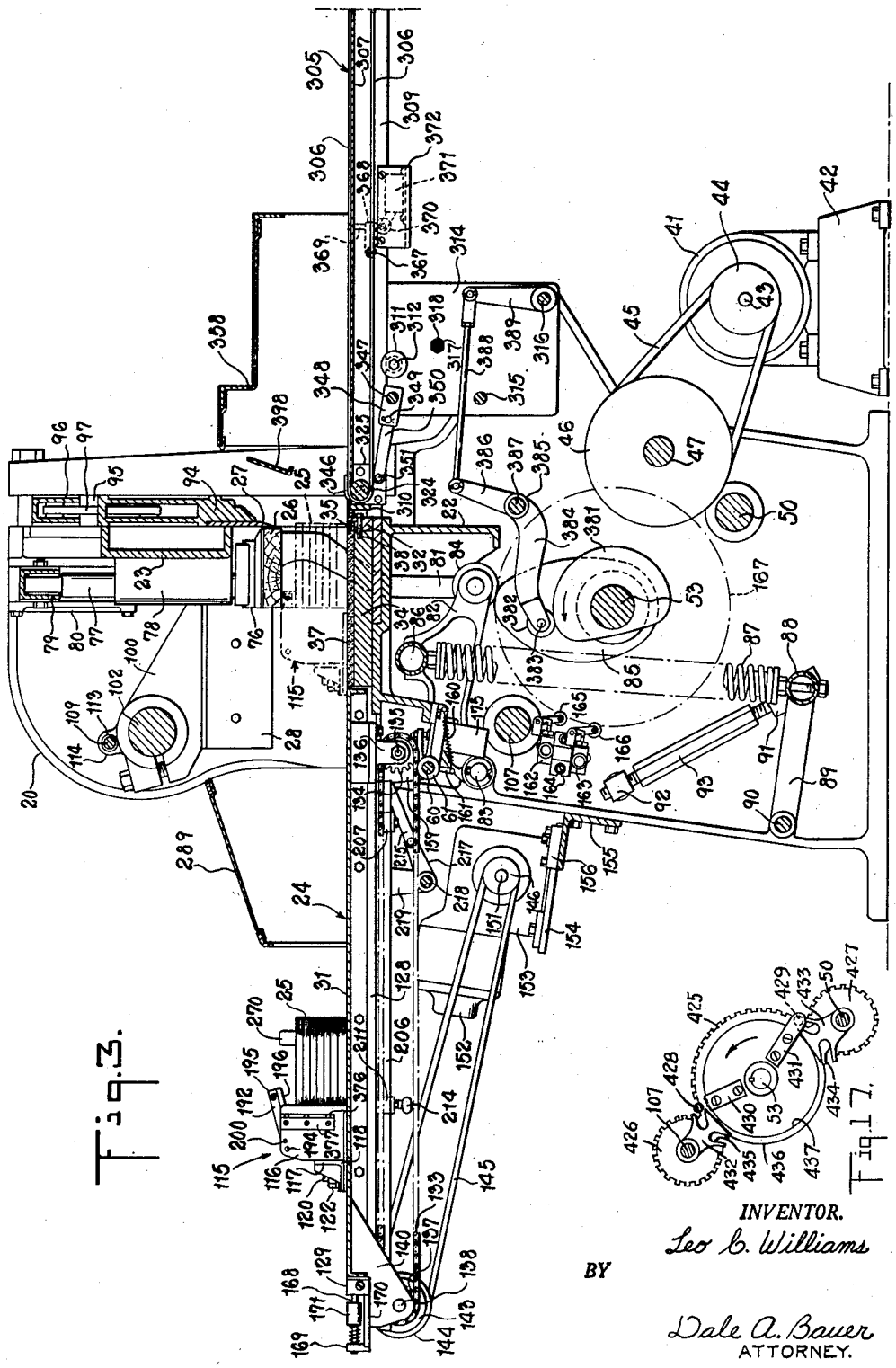

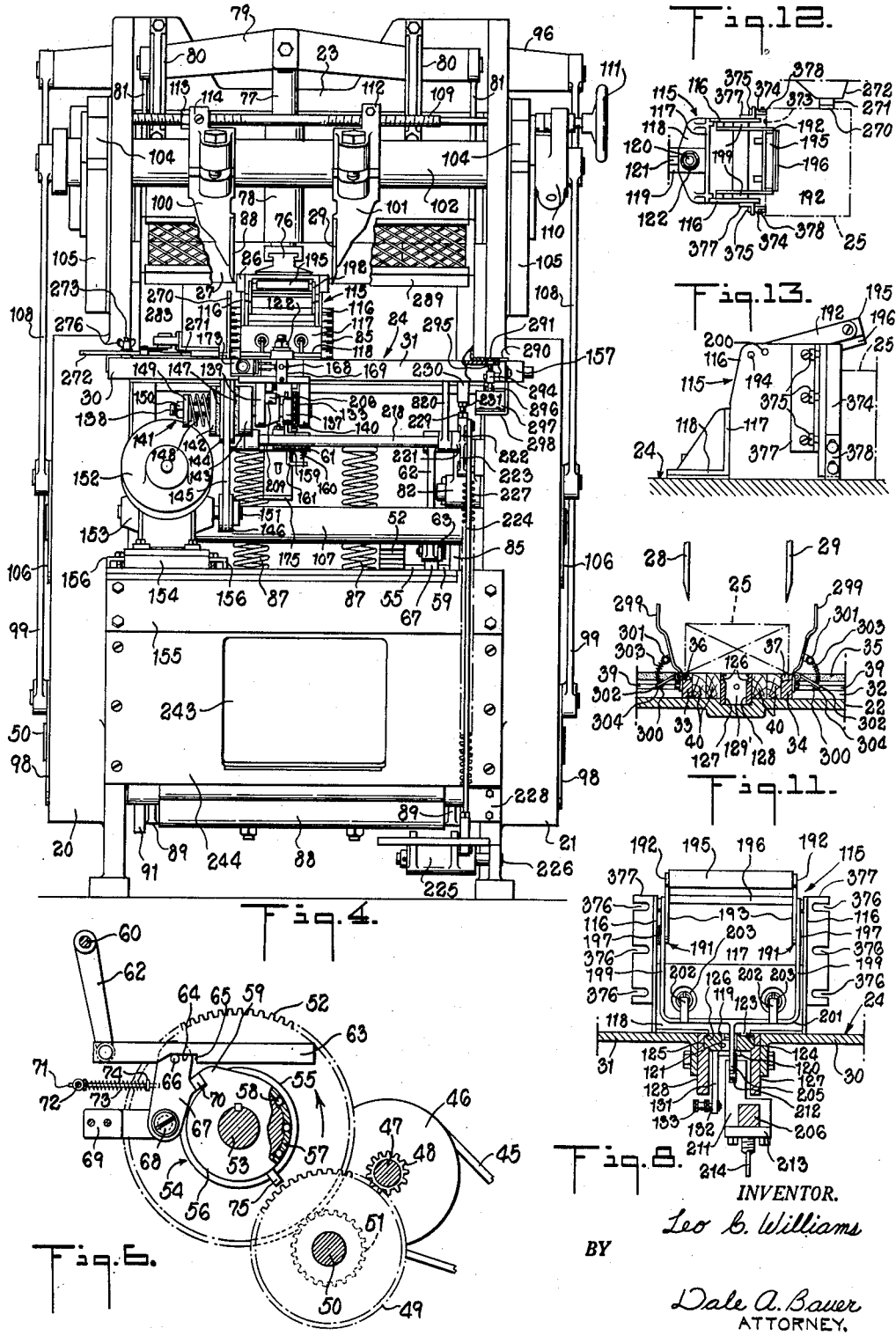
Feb. 19, 1957 — L. C. WILLIAMS — 2,781,842
PAPER TRIMMING AND CUTTING MACHINE
Filed Sept. 5, 1951 — 6 Sheets-Sheet 4
INVENTOR.
Leo C. Williams
BY
Dale A. Bauer
ATTORNEY.

Feb. 19, 1957  L. C. WILLIAMS  2,781,842
PAPER TRIMMING AND CUTTING MACHINE
Filed Sept. 5, 1951  6 Sheets-Sheet 5
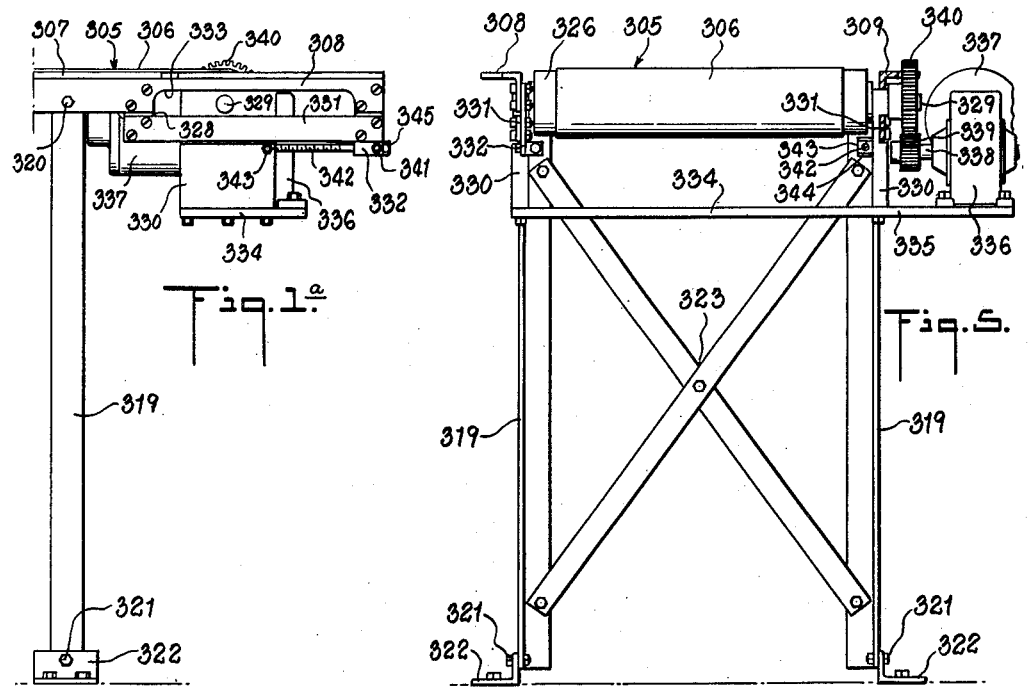
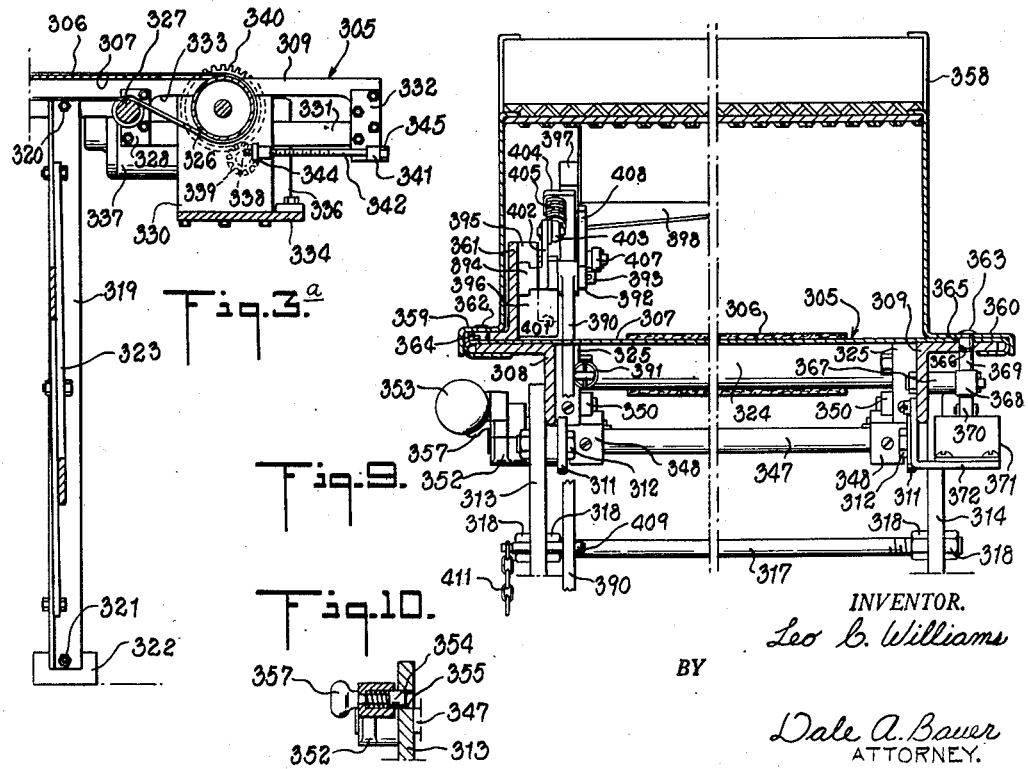
INVENTOR.
Leo C. Williams
BY
Dale A. Bauer
ATTORNEY.

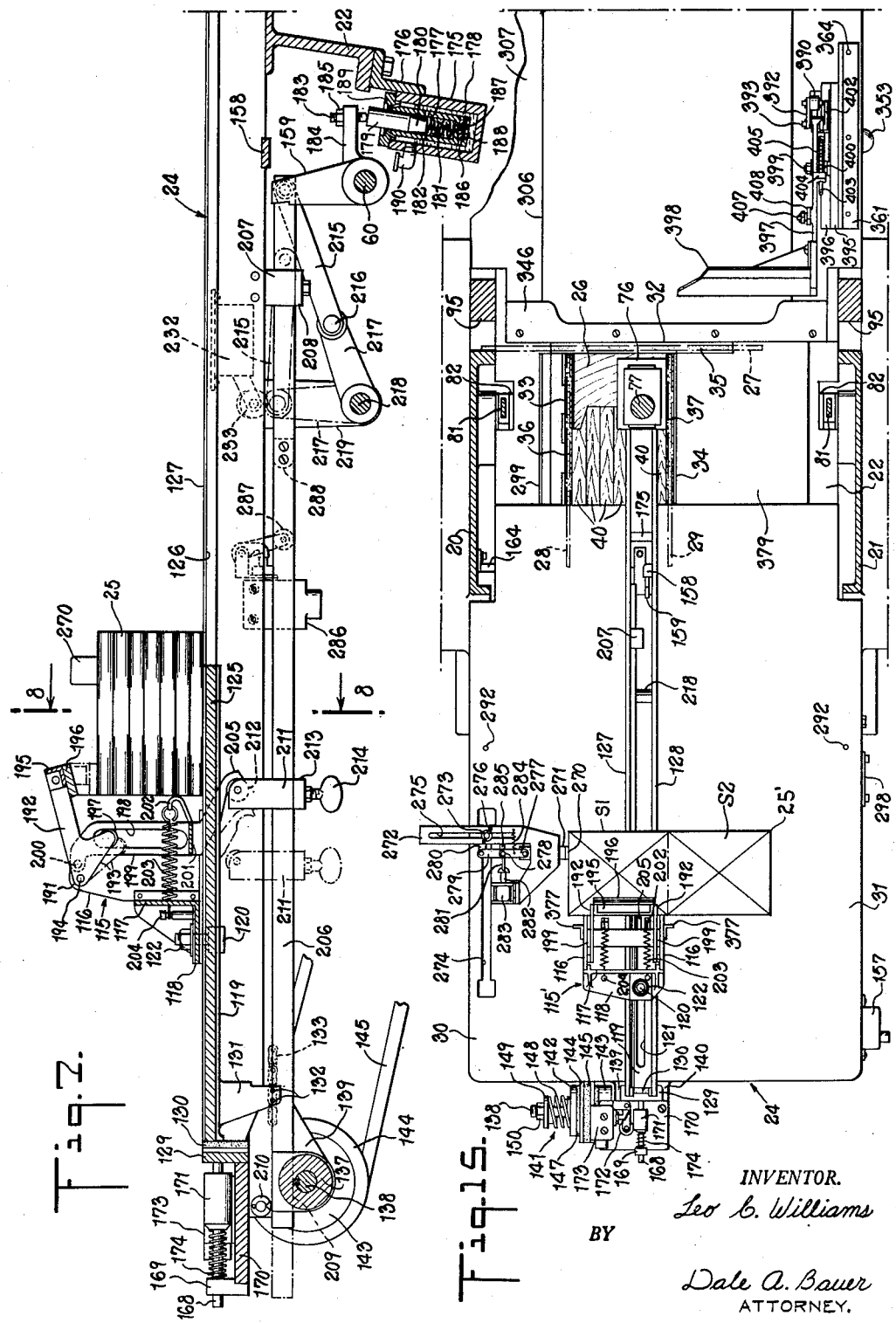

United States Patent Office 2,781,842
Patented Feb. 19, 1957

2,781,842

PAPER TRIMMING AND CUTTING MACHINE

Leo C. Williams, Pearl River, N. Y., assignor, by mesne assignments, to Miehle Printing Press & Manufacturing Company, Chicago, Ill., a corporation of Delaware Application September 5, 1951, Serial No. 245,184

21 Claims. (Cl. 164—48)

This invention relates to paper cutting machines and while capable of general use, is particularly adapted for embodiment in single and multiple knife trimmers for trimming paper material, such as stacks of sewed, wire-stitched, and/or adhesively bound books, booklets, magazines, book-signatures and page-blocks, as well as stacks of unbound book-signatures and other printed or un-printed sheets, to a desired size.

One of the objects of the present invention is to provide in a paper trimmer of the above character a feeding device for feeding a stack of such paper material into cutting or trimming position, and including novel power actuated mechanism which is simple and inexpensive in construction, accurate and reliable in operation for imparting movement to said feeding device to rapidly and uniformly bring said stack to said position and in accurate relation with the knife or knives of said trimmer.

Another object of the invention is to provide an improved paper trimmer having a feed gauge or carriage which is power operated under the control of the operator to feed a stack of such paper material into cutting or trimming position, and which is automatically returned by power to starting position within a single cycle of operation of said trimmer in readiness to receive and feed a succeeding stack of said material to be trimmed.

Another object is to provide an improved paper trimmer having a power operated feed gauge or carriage which is first rapidly actuated to quickly advance a stack of books, signatures, or other sheets toward trimming position and then decelerated to a gradual stop so as to always retain said stack in contact therewith and thereby provide for more accurate positioning of the same with respect to the knife or knives of said trimmer.

Another object is to provide an improved paper trimmer of the above character having a side positioning guide or stop for a stack of books, page-blocks or other sheets to be trimmed, which is automatically moved out of engagement with said stock prior to any feeding movement thereof to trimming position so as to present no interference to said movement and prevent crowding of the stack against said guide, especially when the guide abutting edge of said stack is rough or irregular or is not square with the rear guide edge thereof.

Another object is to provide an improved paper trimmer having a power operated feed gauge or carriage for advancing a stack of books or other paper material from a receiving point distant from the knife or knives of said trimmer into accurate cutting relation with said knife or knives, and wherein the operation of said carriage is controlled by the operator from said distant point, and the operations of the trimmer to clamp and cut the advanced stack are, in turn, inaugurated by and through movement of said carriage, thus affording complete safety against possible injury to the operator as well as accurate trimming of the books.

Another object is to provide an improved paper trimmer having a power-operated reciprocating feed gauge or carriage for advancing stacks of books or other paper material successively along a supporting feed table into accurate cutting relation with the knife or knives of said trimmer, and provided with a movable clamp for holding each stack closely against said feed carriage with sufficient pressure to prevent displacement thereof relative to said carriage while it is being advanced thereby, said clamp being automatically raised to inoperative position when the carriage is returned to starting position to facilitate placing of each stack of books or other paper material beneath the same and in operative engagement with the carriage, and being lowered into clamping relation with the stack under the control of the operator so that said stack is safely clamped before any feeding movement is imparted thereto by said carriage.

A further object is to provide an improved paper trimmer of the above character wherein the successive stacks of books or other paper material are advanced into the trimmer and discharged therefrom through safety tunnels arranged at the receiving and delivery ends of said trimmer, said tunnels serving to prevent access by the operator to the cutting area while the machine is in operation, and to interrupt the driving operation of the machine when one or the other or both are removed or displaced from their normal positions in said machine, thus further protecting the operator against possible injury.

A still further object is to provide an improved paper trimmer of the above character having a delivery conveyor for receiving and further advancing the trimmed stacks of books or other paper material to a point for removal therefrom, and wherein said conveyor is so arranged that it may be moved bodily away from the trimmer without disturbing the driving means therefor to gain access to said trimmer for the purpose of conveniently making necessary repairs and adjustments, and replacing parts thereof.

Often times, the sheet or sheets forming a book are so printed that the impressions are duplicated side by side thereon two, three or more times, whereby two, three or more complete books or portions thereof are expeditiously printed at one time on the same sheet. This manner of printing is commonly referred to as "two-up, three-up, etc." as the case may be. The sheet or sheets so printed are thereafter folded and bound into book form, thus producing a book product which in reality constitutes two, three or more complete books joined together.

Accordingly another object is to provide an improved multiple knife paper trimmer which, through the provision of novel mechanism, is capable of dividing successive stacks of two or more-up books or the like and delivering finished trimmed stacks of single books at the same high hourly output rate as that obtained when handling stacks of books or the like which have been printed one-up or in single-book form.

Another object is to provide an improved multiple knife paper trimmer having novel means arranged to be thrown into operation when handling stacks of books two or more-up in said trimmer, said means acting to move a severed portion of each stack out of cutting relation with the front knife of the trimmer so as to avoid improper cutting action of said knife thereon.

Another object is to provide an improved multiple knife paper trimmer having novel means for deflecting the shavings or trimmings of a stack of books or the like effected by the side knives of said trimmer into the path of movement of a succeeding stack of books or the like to be trimmed, whereby said shavings or trimmings will be cleanly swept from the cutting area by and through movement of said succeeding stack into cutting position.

The above and further objects and novel features of the present invention will more fully appear from the following detail description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, Figs. 1 and 1a are complementary side elevational views of a multiple knife paper trimmer embodying the present invention;

Fig. 2 is a top plan view, partly in section, of the portion of the paper trimmer shown in Fig. 1;

Figs. 3 and 3a are complementary vertical longitudinal sectional views of said paper trimmer as viewed substantially from the position indicated by the line 3—3 of Fig. 2;

Fig. 4 is an end elevational view of said paper trimmer looking from the left of Figs. 1 and 3, certain of the parts having portions thereof broken away for purposes of clearer illustration;

Fig. 5 is an end elevational view looking from the right of Fig. 1a, with portions of certain of the parts broken away for purposes of clearer illustration;

Fig. 6 is a fragmentary side elevational view, partly in section, showing the driving and control means for said paper trimmer, certain of the parts having portions thereof broken away for purposes of clearer illustration;

Fig. 7 is a fragmentary vertical longitudinal sectional view taken substantially on the line 7—7 of Fig. 2, on an enlarged scale and with the in-feed safety tunnel omitted;

Fig. 8 is a fragmentary vertical transverse sectional view on the line 8—8 of Fig. 7, with the stack of paper material to be trimmed removed for the purposes of clearer illustration;

Fig. 9 is an enlarged vertical transverse sectional view taken substantially on the line 9—9 of Fig. 1;

Fig. 10 is a detail vertical sectional view on the line 10—10 of Fig. 1 on an enlarged scale;

Fig. 11 is a vertical transverse sectional view of the cutting bed, showing hinged deflectors for the shavings produced by the side knives of the paper trimmer;

Fig. 12 is a top plan view of the book feed gauge or carriage having extension gauges mounted thereon;

Fig. 13 is an enlarged side elevational view of the feed gauge or carriage shown in Fig. 12;

Fig. 14 is a schematic diagrammatic representation of an electric wiring circuit for the operation and control of certain elements of the paper trimmer;

Fig. 15 is a top plan view showing said paper trimmer as it appears when arranged for pile dividing stacks of books two or more-up;

Figure 1:
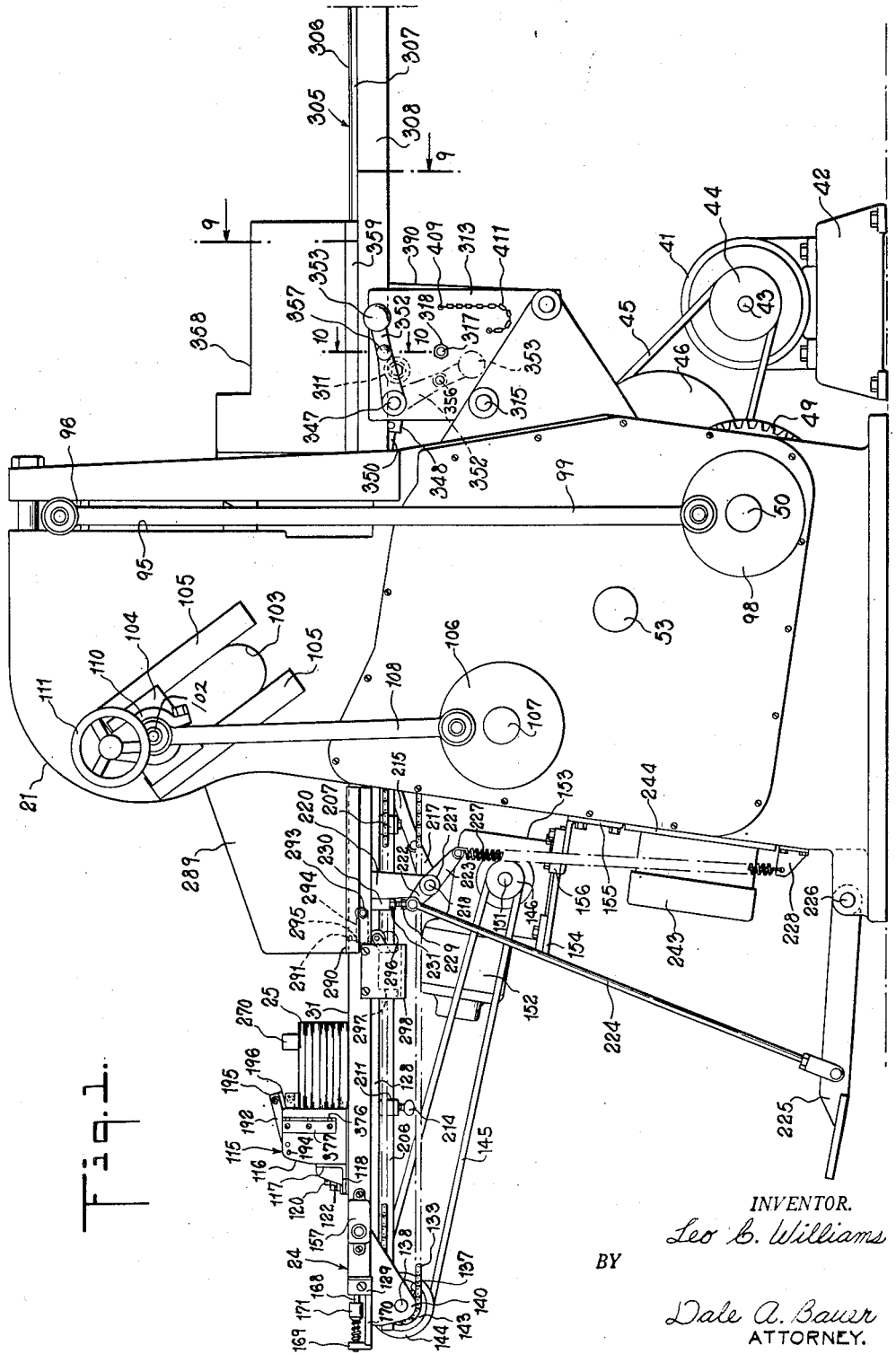

Fig. 16 is a fragmentary side elevational view, partly in section, showing a pusher mechanism which is employed when pile dividing operations are performed in the paper trimmer; and Fig. 17 is a fragmentary side elevational view on a reduced scale, partly in section, showing the detail mechanism for operating the front and side knives, one of the parts having a portion thereof broken away for purposes of clearer illustration.

Referring to the drawings, the present invention is herein illustrated, by way of example, as being embodied in an existing multiple-knife type of paper trimmer employed in trimming successive stacks of sewed, wire-stitched and/or adhesively bound books, booklets, magazines, page-blocks and signatures, as well as stacks of unbound signatures and other printed or unprinted sheets, at the front end and two sides thereof to a required size. It is to be expressly understood, however, that this multiple-knife type of paper trimmer is not to be construed as a limitation, since the present invention may also be embodied with equal advantages in single-knife paper trimmers or cutting machines employed for the same purpose. For the sake of simplicity and clarity in illustrating and describing the present invention, only that portion of said multiple-knife trimmer with which the present invention is actually concerned is herein illustrated.

In the illustrated embodiment, the paper trimmer includes two laterally spaced side frames 20 and 21 resting on the machine foundation and connected together by suitable cross members including a horizontally disposed frame member 22 forming a cutting bed, and a vertically disposed upper cross beam 23, which are bolted or otherwise suitably secured at opposite ends thereof to said side frames (Figs. 1, 2, 3, and 4). Disposed between the side frames 20, 21 and extending rearwardly of said frames and the cutting bed frame member 22 is a feed table indicated generally at 24 on and along which stacks of books 25 or other paper material are successively fed into clamping and cutting relation with a clamp 26, a front knife 27 and two laterally spaced side knives 28 and 29, in a manner and by mechanism to be hereinafter described. As shown in Figs. 2 and 8, the feed table 24 is made in two sections 30 and 31 which are arranged to provide a space therebetween extending longitudinally of the paper trimmer for a purpose to appear hereinafter, the table section 30 being bolted or otherwise suitably secured to the side frame 20 and to the cutting bed member 22, and the table section 31 being bolted or otherwise suitably secured to said cutting bed member and to the side frame 21.

As shown in Fig. 3, the cutting bed frame member 22 is disposed below the level of the feed table 24 so that a front cutting stick holder 32 and two laterally spaced side cutting stick holders 33 and 34 (Fig. 11) may be mounted on and supported by said bed member for cooperation with the knives 27, 28 and 29, respectively. The cutting sticks for the knives 27, 28 and 29 and carried by the holders 32, 33 and 34 are indicated at 35, 36 and 37, respectively, and said sticks and holders extend to the level of the upper surface of the feed table 24 so as to receive the stack of books 25 or other paper material to be trimmed directly from said table and support the same during the trimming or cutting operation. The side cutting stick holders 33 and 34 and the respective cutting sticks 36 and 37 abut against the forward end of the feed table 24 and against the inner sides of the front cutting stick holder 32 and cutting stick 35 carried thereby. The side cutting stick holders 33, 34 are adjustably secured to the front cutting stick holder 32 by means of bolts 38 (Fig. 3) for adjustment therealong to accommodate different sizes of books 25 or other paper material capable of being handled in the machine, said bolts passing through slots 39 (Fig. 11) formed in the holder 32 and being threaded into suitable threaded openings formed in the holders 33 and 34. Blocks 40 (Figs. 2 and 11) of wood or other suitable material are placed in the space defined by the side cutting stick holders 33, 34, the front cutting stick holder 32 and the feed table 24 so as to fill up said space, said blocks resting on the cutting bed member 22 and also extending to the level of the upper surface of said feed table so as to provide a continuation of said surface and a full support for the stack of books 25 or other paper material to be trimmed. The blocks 40 are decreased or increased in number or in thickness depending on the relative spacing of the side cutting stick holders 33, 34 which is governed by the size of the book or other paper material to be trimmed.

The clamp 26, the knives 27, 28 and 29, and certain other movable parts employed during normal operation of the paper trimmer are actuated or driven by an electric motor 41 (Figs. 1 and 3) which is connected with a suitable source of electrical current and is controlled for starting and stopping purposes under normal conditions by suitable switch means (not shown). The motor 41 is bolted or otherwise suitably secured to a motor base or platform 42 which, in turn, is bolted or otherwise suitably secured to the machine foundation. Fixed on the armature shaft 43 of motor 41 is a pulley 44 around which passes a triple V-belt 45 that also passes around a larger diameter pulley 46 which is fixed on a shaft 47 that extends transversely of the trimmer and is journalled in suitable bearings in the side frames 20 and 21, said pulleys being suitably grooved to receive said belt. Fixed on or formed integrally with the shaft 47 is a spur-pinion 48 (Fig. 6) which meshes with and drives a spur-gear 49 that is journalled on a shaft 50 which extends transversely of the trimmer and is rotatably journalled in suitable bearings in the side frames 20, 21 for a purpose to appear hereinafter. Secured to or formed integrally with the gear 49 is a smaller diameter spur-gear 51 which meshes with and drives a considerably larger diameter spur-gear 52 (Figs. 4 and 6) which is loosely mounted on a shaft 53 (Figs. 3 and 6) that extends transversely of the trimmer and is journalled in suitable bearings in the side frames 20, 21. This shaft 53 is the principal shaft from which the clamp 26, the knives 27, 28 and 29, and certain other movable parts of the trimmer are actuated.

A suitable clutch indicated generally at 54 (Fig. 6) is provided for operatively connecting the motor 41 with the shaft 53 through the described gearing and such that said shaft will be rotated in the direction of the arrow indicated in Fig. 6 and will make one complete revolution only for each cycle of operation of the trimmer. This clutch 54 may be of any ordinary and well-known or suitable type, and that herein shown is of the well-known one-way roller type comprising an outer clutch ring 55 which is secured to or formed integrally with the gear 52 and is free to rotate with said gear relative to the shaft 53 when the clutch is disengaged and said shaft is stationary, an inner clutch member 56 which is keyed or otherwise suitably secured to the shaft 53, and an intermediate clutch member or roller cage 57 which is interposed between said outer clutch ring and said inner clutch member. The intermediate clutch member 57 serves to hold the usual series of rollers 58 in spaced-apart relation in the annular inner raceway formed by the outer clutch ring 55, and in position to engage and cause the inner clutch member 56 and said clutch ring to be held in fixed relation to each other when the clutch 54 is engaged, and to release and permit the outer clutch ring 55 and the gear 52 to rotate freely while the shaft 53 is held stationary, when said clutch is disengaged. The inner clutch member 56 and the intermediate clutch member 57 are yieldingly connected in the usual manner by means of the usual compression springs (not shown) interposed between spring-pressed shoulders on said inner and intermediate clutch members. As such clutches are well-known and in common use, a further description thereof is believed to be unnecessary.

The inner clutch member 56 is provided with a radially projecting tripping finger or abutment 59 which is adapted to be engaged and disengaged by a tripping mechanism to be presently described, for the purpose of controlling the disengagement and engagement, respectively, of the clutch 54. The tripping mechanism is adapted to normally engage the finger or abutment 59 at which time the clamp 26 and the knives 27, 28 and 29 of the trimmer are in their normal raised positions, shown in Figs. 3 and 4, and because of such engagement the clutch 54 is normally disengaged, the motor 41 is normally disconnected from the shaft 53, and said shaft is normally stopped and safely held against rotation. When the finger or abutment 59 is disengaged, however, by the tripping mechanism, thus releasing the inner clutch member 56 for rotation, the clutch 54 is automatically engaged, whereupon the motor 41 is connected with the shaft 53 through the described gearing and said clutch, and said shaft is rotated through one complete revolution to effect lowering and raising movements of the clamp 26 and knives 27, 28 and 29 into and out of clamping and cutting relation with the stack of books 25 or other paper material for performance of the clamping and cutting operations thereon. When the shaft 53 has completed one revolution, the finger or abutment 59 is again engaged by the tripping mechanism, whereupon the shaft 53 is stopped and held against further rotation, with the clamp 26 and knives 27, 28 and 29 in raised positions. Stopping of the shaft 53 automatically effects disengagement of the clutch 54, whereupon the motor 41 is disconnected from said shaft and thereafter merely imparts idle rotation to the clutch gear 52 until such time when said clutch is again engaged to effect rotation of said shaft for performance of the clamping and cutting operations by the clamp 26 and knives 27, 28 and 29 on the next or succeeding stack of books 25 or other paper material. As herein shown, the clutch tripping mechanism is constructed, mounted and operated as follows.

Disposed between the side frames 20, 21 and extending midway across said frames, is a clutch control rock shaft 60 (Figs. 3, 6 and 7) which is journalled in suitable bearings provided in the side frame 21 and in a bracket 61 which is bolted or otherwise suitably secured to the cutting bed frame member 22 substantially centrally thereof. Secured to the shaft 60 adjacent the side frame 21 and projecting downwardly from said shaft is a clutch control arm 62 (Figs. 4 and 6) having pivotally connected to the lower free end thereof one end of a horizontally disposed clutch control bar 63 which projects forwardly from said arm over and beyond the clutch 54. This bar 63 is provided in the lower longitudinal edge thereof with an elongated notch 64 which is located rearwardly of the clutch 54 and forms a rearwardly facing vertically extending shoulder 65 on said bar. The notch 64 in bar 63 is adapted to receive a laterally and outwardly projecting pin 66 on which said bar slidably rests in normal position with said pin engaged in said notch and spaced rearwardly from the shoulder 65. This pin 66 is suitably secured in the upper end of a clutch tripping and releasing arm 67 which is mounted at its lower end on a stud 68 for pivotal movement toward and away from the clutch 54. The stud 68 is suitably secured in and projects laterally and outwardly from a bracket 69 that is bolted or otherwise suitably secured to the inner surface of the side frame 21. The arm 67 is formed with a laterally and outwardly offset clutch engaging and releasing lug or shoulder 70, and said arm is so positioned that said lug or shoulder is movable into and out of the path of rotation of the tripping finger or abutment 59 on the inner clutch member 56 to engage and stop and release said clutch member as and for the purpose above described. The arm 67 is yieldingly urged toward the clutch 54 and is yieldingly held in clutch engaging position by a spring-pressed rod 71, one end of which extends loosely through a suitable opening formed in a post 72 which is suitably secured to the side frame 21 and projects inwardly from said frame to receive said rod. The opposite end of the rod 71 extends loosely into a socket or recess formed in the rear side of the arm 67. The compression coil spring 73 for rod 71 surrounds the same between the post 72 and a collar 74 adjustably secured to said rod.

It will thus appear that when the shaft 60 and arm 62 thereon are rocked in a clockwise direction, as viewed in Fig. 6, in a manner to be hereinafter described, an extent sufficient to slide the bar 63 connected with said arm rearwardly and thereby cause the shoulder 65 on said bar to engage the pin 66 and swing the arm 67 in a counter-clockwise direction (Fig. 6) about its pivotal axis 68 against the tension of the spring-pressed rod 71, the lug or shoulder 70 on the arm 67 will be moved out of engagement with the finger or abutment 59 on the inner clutch member 56, thus releasing said clutch member. Thereupon, the clutch 54 will be automatically engaged, thus connecting the clutch gear 52 with the shaft 53 and through rotation of said gear by the motor 41 and gears 48, 49 and 51 said shaft will be rotated in the direction of the arrow indicated in Fig. 6. When the shaft 60 and arm 62 are thereafter rocked in a counter-clockwise direction and returned to their original normal position shown in Fig. 6, in a manner to be hereinafter described, which occurs during the first revolution of the shaft 53, the bar 63 will be moved forwardly by said arm and returned to its original normal position (Fig. 6), thus releasing the arm 67. Thereupon, the arm 67 will be rocked in a clockwise direction (Fig. 6) by the spring-pressed rod 71 and returned to its original normal position (Fig. 6) to cause the lug 70 on said arm to engage the finger 59 on the inner clutch member 56 and thereby stop said clutch member and the shaft 53 upon completion of one revolution thereof representing one cycle of operation of the trimmer. Stopping of the clutch member 56 and shaft 53 automatically effects disengagement of the clutch 54 which then remains so disengaged until the clutch control shaft 60 is again actuated at which time the above described operations are repeated for the performance of another cycle of operation of the trimmer.

In order to insure stopping of the shaft 53 by the clutch control arm 67 upon completion of one revolution of said shaft, the inner clutch member 56 is provided in the peripheral surface thereof with a radially extending pin 75 (Fig. 6) which is located diametrically opposite the finger or abutment 59. This pin 75 serves to engage and raise the clutch control bar 63 out of engagement with the pin 66 when the shaft 53 has rotated one-half of a revolution, thus permitting return of the arm 67 by the spring-pressed rod 71 to clutch disengaging position so as to cause the lug 70 on said arm to be disposed in the path of rotation of the finger 59 well in advance thereof for engagement thereby when the shaft 53 has completed one revolution. It will be noted that engagement of the finger 59 on clutch member 56 with the lug 70 on clutch arm 67 positively limits the rotation of the shaft 53 to one complete revolution for each cycle of operation of the trimmer and prevents over-travel of said shaft by momentum or otherwise.

Before proceeding with the description of the feeding mechanism of the present invention, for feeding the stacks of books 25 or other paper material into accurate clamping and cutting relation with the clamp 26 and knives 27, 28 and 29, the mounting and operation of said clamp and said knives will now be briefly described. As shown in Figs. 2, 3 and 4, the clamp 26 is in the form of a rectangular block of wood or other suitable material and is of a size so as to leave the front end and two sides of the stack of books 25 or other paper material sufficiently exposed to permit performing of the trimming operations thereon by the knives 27, 28 and 29. Different sizes of clamp blocks 26 are employed for different sizes of books 25 or other paper material. The clamp block 26 is removably secured to a holder 76 which, in turn, is removably carried by a vertically extending plunger 77 at the lower end thereof. The plunger 77 is reciprocably mounted in a suitable guide 78 formed on the rear face of the cross-beam 23. The plunger 77 projects beyond the upper end of the guide 78 and has its upper end secured to a transversely extending yoke 79 which is reciprocably mounted in suitable guides formed by the cross-beam 23 and by two transversely spaced brackets 80 suitably secured to said cross beam.

Straight line vertical reciprocating movement is imparted to the yoke 79 for moving the clamp block 26, through the described operating connections therefor with said yoke, toward and away from the cutting bed 22 into and out of clamping engagement with the stack of books 25 or other paper material. For this purpose, the yoke 79 has pivotally connected to opposite ends thereof the upper ends of vertical links 81 (Figs. 2, 3 and 4) which extend downwardly from said yoke through suitable clearance openings in the cutting bed frame member 22. The lower ends of the links 81 are pivotally connected to cam levers 82 (Fig. 3) which are pivotally mounted on short shafts 83 secured to and projecting inwardly from the side frames 20 and 21. The cam levers 82 have journalled thereon rollers 84 which are engaged by identical cams 85 that are fixed on the single revolution shaft 53 adjacent the side frames 20, 21.

The cam levers 82 have suitably connected thereto opposite ends of a transversely extending tube 86 (Fig. 3) to which the upper ends of long and heavy extension coil springs 87 are suitably anchored, said springs serving to yieldingly urge said levers toward the cams 85 and to apply the proper degree of pressure of the clamp block 26 on the stack of books 25 or other sheets so that said books or sheets are firmly clamped against the cutting bed and thereby held against relative displacement during the performance of the trimming operations thereon. The lower ends of the springs 87 are suitably anchored to a transversely extending tube 88 which is suitably carried at opposite ends thereof by arms 89 which are loosely mounted on a transversely extending shaft 90 that is fixed in the side frames 20, 21. Associated with the arms 89 are blocks 91, and threadedly engaged with said blocks and with other blocks 92 carried by the side frames 20, 21 are adjustable bars 93 for maintaining the springs 87 under a predetermined tension and for increasing and decreasing said tension to vary the pressure of the clamp block 26 for stacks of books 25 or other sheets of different kinds and weights of paper.

It will thus appear that when the clutch 54 is engaged and the shaft 53 is rotated a single revolution as above described, the levers 82 will be spring-operated in one direction by the springs 87 under the control of the cams 85 to lower the clamp block 26 into clamping engagement with the stack of books 25 or other sheets, and will be cam-operated by said cams to raise said clamp block out of engagement with the trimmed stack of books or other sheets, said cams being so shaped that the clamp block 26 will be held in clamping engagement with the stack of books 25 or other sheets until the two sides and the front end of said stack are trimmed by the knives 28 and 29, and 27, respectively, and then only raised to release the trimmed stack for further movement by a succeeding stack of books or other sheets onto a delivery conveyor to be hereinafter described.

The front knife 27 is bolted to a vertically extending knife bar 94 which extends transversely of the trimmer and is reciprocably mounted in suitable guide-ways 95 provided in the side frames 20 and 21 (Figs. 2 and 3). Disposed above the knife bar 94 and extending transversely of the trimmer and beyond the side frames 20, 21 is a yoke 96 which is reciprocably mounted in the guide-ways 95. The yoke 96 is operatively connected to the knife bar 94 by means of links 97 for vertically reciprocating said knife bar and the knife 27 and at the same time imparting the usual lateral component of motion thereto, whereby the front end or edge portion of the stack of books 25 or other sheets is cleanly trimmed by said knife with a shearing action. Vertical reciprocating movement is imparted to the yoke 96 to move the knife 27 toward and away from the cutting bed 22 into and out of engagement with the cutting stick 35 in the performance of the trimming operation on the front end or edge portion of the stack of books 25 or other sheets, and said movement is effected, upon rotation of the shaft 53, through suitable mechanism to be hereinafter described, including the hereinbefore described shaft 50 which is actuated by the shaft 53 through said mechanism and has fixed thereon at opposite ends thereof crank discs 98 having pivotally connected thereto the lower ends of vertically extending links 99, the upper ends of which are pivotally connected to the yoke 96 (Figs. 1, 2 and 4).

The side knives 28 and 29 are bolted to knife arms 100 and 101, respectively (Figs. 2, 3 and 4), which are releasably clamped to a transversely extending shaft 102 for adjustment along said shaft to accommodate different sizes of books or the like that may be handled in the trimmer. Opposite ends of the shaft 102 project through suitable upwardly and forwardly inclined elongated openings 103 formed in the side frames 20, 21, and said shaft is provided at said ends with bearing blocks 104 which are reciprocably mounted between correspondingly inclined guide bars 105 secured to said side frames exteriorly thereof. By virtue of the inclined guide bars 105, the knives 28 and 29 are caused to move downwardly and at the same time forwardly toward the cutting bed 22 so that the opposite side edge portions of the stack of books 25 or other sheets are cleanly trimmed by said knives with a shearing action. The shaft 102 is reciprocated along the guide bars 105 to move the knives 28, 29 toward and away from the cutting bed 22 into and out of engagement with the respective cutting sticks 36 and 37, and said operation is effected, upon rotation of the shaft 53, through suitable mechanism to be hereinafter described, actuated by the latter shaft and including crank discs 106 (Figs. 1, 2, and 4) which are fixed on opposite ends of a shaft 107 which is rotated by the shaft 53 through said mechanism. The crank discs 106 have pivotally connected thereto the lower ends of vertically extending links 108, the upper ends of which are pivotally connected to the opposite ends of the shaft 102 exteriorly of the bearing blocks 104. The shaft 107 extends transversely of the trimmer and is journalled in suitable bearings in the side frames 20, 21.

It will thus appear that the clamp 26 and the knives 27, 28, and 29 are operated from the single revolution shaft 53 through rotation of said shaft, and the operations of said clamp and knives are so timed that the clamp 26 is first moved downwardly into clamping engagement with the stack of books 25 or other sheets, then the side knives 28, 29 are moved downwardly through said stack and into engagement with the respective cutting sticks 36, 37 and then raised to their original positions, thus effectively trimming the opposite side edge portions of said stack, then the front knife 27 is moved downwardly through the stack and into engagement with the cutting stick 35 and then raised to its original position, thus effectively trimming the front end or edge portion of said stack, and then the clamp 26 is raised to its original position to release the trimmed stack, all said operations occurring during one cycle of operation of the trimmer represented by a single revolution of the shaft 53.

There is shown in Fig. 17 of the drawings, one form of mechanism for operating the side knives 28, 29 and the front knife 27 in the timed relation above described, said mechanism comprising a segmental spur gear 425 which is located exteriorly of the side frame 21 and is keyed or otherwise suitably secured to the single revolution drive shaft 53 for rotation therewith. This segmental gear 425 is so arranged that upon rotation thereof by the shaft 53 one complete revolution in the direction of the arrow, it will first mesh with and rotate a spur gear 426 and as it moves out of meshing engagement with said gear it will mesh with and rotate a similar spur gear 427. The spur gear 426 is pinned or otherwise suitably secured to the shaft 107 which carries the crank discs 106 that operate the side knives 28, 29, and the spur gear 427 is pinned or otherwise suitably secured to the shaft 50 which carries the crank discs 98 that operate the front knife 27.

When the single revolution drive shaft 53 is stationary at which time the trimmer clutch 54 is disengaged and the knives 27, 28 and 29 are disposed in their normal uppermost inoperative positions, the segmental gear 425 occupies the position thereof shown in Fig. 17 wherein it will be noted that said gear is out of meshing engagement with both gears 426 and 427. The radius of the segmental gear 425, the length of the arc of said gear, and the size of the gears 426 and 427 are so chosen that upon rotation of the segmental gear 425, the gears 426 and 427 will be rotated a major portion of one revolution by said segmental gear for each complete revolution of the latter. The actual timing of the operation of the knives 28, 29 and 27, and rotation of the gears 426 and 427 one complete revolution during each cycle of operation of the drive shaft 53 is effected by Geneva movements comprising pins 428 and 429 which are suitably secured to and project inwardly from radially extending arms 430 and 431, respectively, that are bolted or otherwise suitably secured to the outer surface of the segmental gear 425. The pin 428 is located substantially on the pitch line of the segmental gear 425 and a short distance in advance of the leading tooth of said segmental gear, and the pin 429 is located substantially on said pitch line and a short distance rearwardly of the trailing tooth of said segmental gear. The pins 428 and 429 cooperate with slotted arms 432 and 433 which are pinned or otherwise suitably secured to the shafts 107 and 50, respectively, or to the gears 426 and 427, respectively, as desired.

It will thus appear that upon rotation of the segmental gear 425 from the position thereof shown in Fig. 17 in the direction of the arrow, the pin 428 will immediately engage the arm 432, and the pin 429 will immediately move away from the arm 433. Under these conditions, no rotation will be imparted to the gear 427 and, hence, the front knife 27 will remain in its raised inoperative position, and an initial rotation will be imparted to the gear 426 by the pin 428 through engagement thereof with the arm 432, thereby imparting an initial downward movement to the side knives 28, 29. Continued rotation of the segmental gear 425 will bring the same into meshing engagement with the now rotating gear 426, whereupon the latter gear will then be rotated by said segmental gear a major portion of one revolution, thereby lowering the side knives 28, 29 their full extent and raising the same a substantial distance. Shortly before the segmental gear 425, through continued rotation thereof, moves out of meshing engagement with the gear 426 which occurs substantially at the end of one-half of a revolution of said segmental gear, the pin 429 will mesh with the rotating arm 432 and as the segmental gear moves out of meshing engagement with the gear 426, said pin through engagement thereof with said arm will continue the rotation of the gear 426 the remainder of one revolution and then move out of engagement with said arm, thereby completing the upward movement of the side knives 28, 29. When the pin 429 moves out of operative engagement with the arm 432, the gear 426 is no longer under the influence of any driving force and, hence, it is caused to stop with the crank pins on the discs 106 in their uppermost dead center positions and with the arm 432 in its original position for operation during the next cycle of operation of the trimmer.

As the segmental gear 425 moves out of meshing engagement with the gear 426 as above-described, it simultaneously moves into meshing engagement with the gear 427, but shortly before this occurs, the pin 428 engages the stationary arm 433 and imparts an initial rotation to the gear 427 through said arm, thereby imparting an initial downward movement to the front knife 27. Continued rotation of the segmental gear 425 will then bring the same into meshing engagement with the now rotating gear 427, whereupon the latter gear will be rotated by said segmental gear a major portion of one revolution, thereby lowering the front knife 27 its full extent and raising the same a substantial distance. Shortly before the segmental gear 425, through continued rotation thereof, moves out of meshing engagement with the gear 427 which occurs at the end of one complete revolution of said segmental gear, the pin 429 will mesh with the rotating arm 433 and as the segmental gear moves out of meshing engagement with the gear 427, said pin through engagement thereof with said arm will continue the rotation of the gear 427 the remainder of one revolution, thereby completing the upward movement of the front knife 27. At this time, the segmental gear 425 has completed one revolution and is caused to stop in its original position shown in Fig. 17 clear of both gears 426 and 427, and with the crank pins on the discs 98 in their uppermost dead center positions, said stopping of said segmental gear in said position being effected through disengagement of the trimmer clutch 54 and stopping of the drive shaft 53 as hereinbefore described.

In order to prevent accidental rotation of the crank discs 98 and 106 and lowering of the knives 28, 29 and 27 thereby when the trimmer is inoperative at which time the segmental gear 425 is clear of the gears 426 and 427 as above described, holding elements 434 and 435 are secured to the shafts 50 and 107, respectively, and located between the respective arms 433 and 432 and the respective gears 427 and 426. These holding elements 434 and 435 are each formed with a smooth concave edge portion which mates with a smooth convex surface 436 forming the outer periphery of a segmental flange 437 which is formed on the segmental gear 425 concentric with the axis of rotation of said gear. The flange 437 projects outwardly beyond the outer surface of the teeth of the segmental gear 425 to receive the elements 434, 435, and the opposite ends of said flange terminate a short distance from the endmost teeth of said gear to permit said elements to clear said flange upon rotation of the gears 426 and 427 and therewith the elements 435 and 434, respectively, by the segmental gear. The outer peripheral surface 436 of the flange 437 is located slightly below the base line of the teeth of the segmental gear 425.

It will thus be apparent that when the segmental gear 425 is in its stopped neutral position shown in Fig. 17, the gears 426 and 427 are held by the elements 435 and 434, respectively, and the cooperating flange 437 against accidental rotation in either direction, thereby preventing accidental downward movement of the knives 27, 28 and 29 and holding the same in their normal uppermost starting positions. However, when the segmental gear 425 is rotated and rotation is imparted to the gears 426 and 427 by the pin 428 and said segmental gear as above described, the elements 435 and 434 rotate with the gears 426 and 427, respectively, and clear the rotating flange 437, thus presenting no interference to the rotation of the gears 425, 426 and 427 and enabling accurate timed operation of the knives 27, 28 and 29.

When the knife arms 100, 101 are released from the shaft 102, said arms may be simultaneously adjusted toward and away from each other by means of a screw shaft 109 (Figs. 3 and 4) which is rotatably mounted in an arm 110 that is fixed on the end of the shaft 102 adjacent the side frame 21. The screw shaft 109 has fixed thereon at the end thereof adjacent the arm 110 a hand wheel 111 for rotating said shaft. The screw shaft 109 extends laterally through the opening 103 in the side frame 21 and is provided with right and left-hand threaded portions which pass through an internally threaded split extension 112 of the knife arm 101 and through an internally threaded sleeve 113 which is releasably secured in an extension 114 of the knife arm 100. The split extension 112 and the releasable sleeve 113 provide for individual adjustment of the knife arms 101, 100 relatively to each other along the shaft 102. Loosening of the split extension 112 permits adjustment of the knife arm 100 relatively to the arm 101, loosening of the sleeve 113 permits adjustment of the knife arm 101 relatively to the knife arm 100, tightening of both extension 112 and sleeve 113 permits simultaneous adjustment of both knife arms toward and away from each other, and clamping of the knife arms to the shaft 102 locks said knife arms in adjusted positions.

In accordance with one aspect of the present invention, stacks of books 25 or other paper material are successively fed by a feed gauge or carriage, indicated generally at 115, from a loading point on the feed table 24 distant from the knives 27, 28 and 29 along said table into accurate clamping and cutting relation with respect to said knives and the clamp 26, said feed gauge or carriage being power operated under the control of the operator from a remote point for rapidly feeding each stack to clamping and cutting position, and being automatically returned by power to said loading point within a single cycle of operation of the trimmer, in readiness to receive and feed a succeeding stack just as soon as one cycle of operation of said trimmer is completed, whereby a comparatively high hourly output of trimmed stacks of books 25 or other paper material may be obtained, with less fatigue on the part of the operator, and at the same time adequately protecting the operator against possible injury. As herein shown, the feed gauge or carriage 115 and the power actuated means for operating said feed gauge or carriage comprise the following instrumentalities which are preferably constructed and mounted as follows:

As shown, particularly in Figs. 1, 2, 4, 7 and 8, the feed gauge or carriage 115 comprises a pair of transversely spaced vertically and longitudinally extending side plates 116 having rear portions thereof bolted or otherwise suitably secured to opposite ends of a transversely extending upright plate 117 which terminates in a rearwardly extending horizontal base plate 118. The front edges of the side plates 116 are transversely aligned and they provide stack guiding or positioning edges against which the stack of books 25 or other sheets is placed by the operator. As will hereinafter appear, the trimmer is adapted for trimming stacks of books or other sheets printed as singles and better known as "one-up," as shown in Fig. 2, as well as for trimming and dividing stacks of books or other sheets printed as doubles and better known as "two-up" as shown in Fig. 15. It is to be understood that books printed three-up or more may also be effectively handled in the machine.

When trimming stacks of books 25 or other sheets printed as singles or one-up, the feed carriage 115 is transversely located centrally with respect to the space between the feed table sections 30, 31, as shown in Figs. 2 and 4, and is releasably secured to a horizontal feed bar 119 by means of a T-bolt 120 (Figs. 7 and 8) which is engaged in a slot 121 formed in said bar. The bolt 120 extends through the slot 121 and through a suitable clearance opening in the base plate 118 of the feed carriage 115 and has threaded thereon a clamping nut 122. This permits of shifting the feed carriage 115 along the feed bar 119 to various positions for books or other sheets of different sizes, the slot 121 extending substantially the entire length of said bar. The base plate 118 of the feed carriage 115 is provided on the underside thereof with a slot downwardly projecting lug or key 123 which is slidably engaged in a groove 124 which is formed in the upper surface of the feed bar 119 and extends the entire length of said bar (Figs. 2 and 8), said key and groove serving to hold the feed carriage square with the feed bar and against horizontal pivotal movement relative to said bar and the feed table 24.

The feed bar 119 is located in the space between the feed table sections 30, 31 and flush with the upper surfaces of said table sections, and is formed at opposite sides thereof with laterally projecting tongues 125 (Figs. 7 and 8) which are slidably engaged in suitable grooves 126 formed in the opposed inner surfaces of two transversely spaced vertically arranged flat guide bars 127 and 128. The guide bars 127, 128 are also disposed in the space between the feed table sections 30, 31 and are bolted or otherwise suitably secured to the opposed inner surfaces of said table sections with their upper surfaces flush with the upper surfaces of the table sections. The guide bars 127, 128 are of such length that they extend from a point rearwardly beyond the rear edges of the table sections 30, 31 forwardly along and beyond said table sections, over the cutting bed frame member 22, between the spacer blocks 40, to substantially the forward end of said cutting bed frame member. The tongues 125 extend the full length of the feed bar 119, and the grooves 126 extend the full length of the guide bars 127, 128, and said tongues and grooves serve to effectively guide said feed bar and the feed carriage 115 thereon for straight-line reciprocating movement relative to the feed table 24.

The rearwardly projecting ends of the guide bars 127, 128 have bolted, or otherwise suitably secured thereto a bracket 129 (Figs, 1, 2 and 7) which spans and connects said bars and to which is suitably secured a bumper pad or block 130 made of rubber or other suitable cushioning material. The bumper pad 130 is normally engaged by the feed bar 119, as shown in Figs. 2 and 7, and said feed bar is adapted to engage and stop against said bumper pad upon each return movement thereof, thereby establishing a definite rearward starting position of the feed bar for each stack feeding operation thereof. Engagement of the feed bar 119 with the bumper pad 130, in turn, locates the feed carriage 115 in a definite rearward starting position spaced a definite distance from the cutting edge of the front knife 27, whereby presentation of successive stacks of books 25 or other sheets by said feed carriage to the trimmer in accurate cutting relation with said knife is always assured. It is to be understood that while the starting position of the feed bar 119 remains fixed at all times, the starting position of the feed carriage 115 is variable and is governed by the length of the books or other sheets being handled. As the length of the books or other sheets increases from the minimum to the maximum capacity of the trimmer, the feed carriage 115 in starting position is located farther away from the cutting edge of the front knife 27. The forward ends of the guide bars 127, 128 have bolted or otherwise suitably secured thereto a bracket 129' (Fig. 11) which is similar to the bracket 129 and spans and connects said bars. The bracket 129' serves as a mounting bracket to which the front cutting stick holder 32 is bolted or otherwise suitably secured.

Secured to or formed integrally with the feed bar 119 on the underside and adjacent the rear end thereof is a flat lug or finger 131 (Figs. 7 and 8) which projects downwardly from said bar beyond the lower longitudinal edges of the guide bars 127, 128. The lug 131 is disposed at right angles to the feed bar 119 and in parallel relation with the guide bars 127, 128 and is located in close proximity to the guide bar 128 for a purpose to appear hereafter. The lug 131 is provided adjacent the lower free end thereof with at least two longitudinally spaced clearance openings which are adapted to receive two correspondingly spaced pins 132 which project inwardly from and form part of the upper reach of an endless chain 133 (Figs. 3, 7 and 8). This chain 133 is disposed beneath the feed table 24 and below the guide bar 128 and extends longitudinally of said table and bar in parallel relation therewith. Lateral displacement of the chain 133 from the lug 131 may be prevented by any suitable known means, such as cotter pins inserted in the free ends of the pins 132 or the usual link connecting plate pressed over said pins by a snap-fit.

The front portion of the chain 133 passes around an idler sprocket 134 (Fig. 3) which is located adjacent the forward end of the feed table 24 and is journalled on a stud 135 suitably secured in a bracket 136 which is bolted or otherwise suitably secured to the underside of the feed table section 31 and projects downwardly therefrom, said stud projecting inwardly from said bracket to receive said sprocket. The rear portion of the chain 133 passes around a driven sprocket 137 (Figs. 1, 3, 4 and 7) which is located beyond the rear end of the feed table 24 and is keyed or otherwise suitably secured to a short transversely extending shaft 138. This shaft 138 is journalled in suitable bearings provided in laterally spaced rear extensions 139 and 140 of the table sections 30, 31, respectively. The sprocket 137 is disposed between the bearing extensions 139, 140 and in close proximity to the bearing extension 140, and the shaft 138 projects beyond the bearing extension 139. The bracket 136 is adjustably secured to the feed table section 31 so that slack may be taken up in the chain 133 as desired.

Mounted on the outwardly projecting end of the shaft 138 is a friction slip clutch 141 (Figs. 2 and 4) of a well-known design and comprising two metallic disks 142 and 143 which are keyed to said shaft in axially spaced relation. The outwardly projecting clutch supporting portion of the shaft 138 is reduced in diameter to provide an annular shoulder thereon which is engaged by the disk 143 and serves to hold said disk out of frictional contact with the bearing extension 139 and against axial sliding movement relative to said shaft in a direction toward said bearing extension. The disk 142 is fitted on the shaft 138 for axial sliding movement relative to said shaft for a purpose to be presently described. Loosely mounted on the shaft 138 and disposed between the disks 142, 143 is a pulley 144 suitably grooved to receive a V-belt 145 which passes around said pulley and extends therefrom beneath the feed table 24 and also passes around a smaller diameter pulley 146 suitably grooved to receive said belt (Figs. 1, 3 and 4). Loosely mounted on the shaft 138 and disposed between the disk 142 and pulley 144 and between said pulley and the disk 143 are axially movable leather disks 147, and all said disks and said pulley are retained in frictional driving contact with each other by a coil compression spring 148 surrounding the shaft 138 and having one end engaging against the disk 142 and the opposite end engaging against a disk 149 which is adjustably threaded on the outer end of said shaft. The disk 149 is employed to vary the tension of the spring 148 and thereby adjust the effective action of the clutch 141. A nut 150 threaded on the outer end of the shaft 138 holds the disk 149 in adjusted position and against axial outward displacement from said shaft.

The pulley 146 is fixed on the output shaft 151 of a speed reduction drive unit 153 which includes an electric motor 152 coupled thereto and forming a part thereof (Figs. 1, 3 and 4). The electric motor and speed reduction drive unit 152, 153 is disposed beneath the feed table 24 and is bolted or otherwise suitably secured to a plate 154 which is supported on an angle-iron 155 that extends transversely of the trimmer and is bolted or otherwise suitably secured to the side frames 20, 21. The plate 154 is releasably secured to the angle-iron 155 by means of clamps 156 so that the electric motor and speed reduction drive unit 152, 153 may be bodily shifted relative to said angle-iron to adjust the tension of the belt 145 and for belt replacement purposes.

It will thus be apparent that the chain 133 is driven by the motor 152 through the speed reduction unit 153, belt 145 and clutch 141, and that said chain will, through the described connections therefor with the lug 131 on the feed bar 119, thus inpart sliding movement to said feed bar and the feed carriage 115 thereon relative to the feed table 24. The motor 152 is of the reversible type, and hence, is adapted to drive the chain 133 in one direction to impart feeding movement to the feed bar 119 and feed carriage 115, and in the opposite direction to impart return movement to said feed bar and said feed carriage, said operations of the motor being inaugurated under the control of the operator and thereafter effected automatically in a novel manner and by means to be presently described.

The motor 152 is normally stopped with the feed bar 119 and the feed carriage 115 in their rearmost normal positions, as shown in Figs. 2 and 7, to receive a stack of books 25 or other sheets to be trimmed. When a stack of books 25 or other sheets is placed on the feed table 24 in proper feeding position against the feed carriage 115, the operator closes a normally open motor starting switch 157 of the push-button type, which is connected in the electrical control circuit for the motor 152, as illustrated in Fig. 14 and to be hereinafter described in detail. This switch 157 is located at a convenient and safe point away from the knives 27, 28 and 29 of the trimmer for operation by the operator, and as herein shown, is mounted on the feed table 24 at one side and adjacent a rear corner thereof (Figs. 1, 2, and 4). Closing of the switch 157 by the operator starts the motor 152 so that the output shaft 151 of the speed reduction drive unit 153 is rotated by said motor in a clockwise direction, as viewed in Fig. 3, whereupon the feed bar 119 is rapidly moved forwardly by the chain 133, thus quickly advancing the feed carriage 115 and the stack of books 25 or other sheets to be trimmed over and along the feed table 24 toward the trimmer until said feed carriage reaches the broken line position thereof shown in Fig. 3, and said stack is positioned by said carriage in accurate clamping and cutting relation with respect to the clamp 26 and knives 27, 28 and 29 of the trimmer. Thereupon, the feed bar 119 is stopped to prevent further forward movement of the feed carriage 115 and the stack of books 25 or other sheets advanced thereby.

This stopping of the feed bar 119 and the feed carriage 115 with the stack of books 25 or other sheets in accurate clamping and cutting position, as above described, is effected, without stopping the motor 152, through engagement of the lug 131 on the feed bar 119 with a stop-lug 158 (Figs. 2 and 7). This stop-lug 158 is secured to or formed integrally with the guide bar 128 and projects laterally and inwardly from said guide bar into the path of forward movement of the lug 131 to be engaged by the latter when the stack of books 25 or other sheets being advanced by the feed bar 119 and feed carriage 115 arrives in accurate cutting and clamping position. The stop-lug 158 is located in advance of the sprocket 134, and engagement of the lug 131 with said stop-lug and resulting stopping of the feed bar 119 in no way affects the operation of the motor 152 due to the slip clutch connection 141 between said motor and the chain 133. It is to be noted that when the feed bar 119 is stopped through engagement of the lug 131 with the stop-lug 158, the pulley 144, through continued operation of the motor 152, will slip relative to the clutch disks 142, 143 and thus tend to rotate said disks and to drive the chain 133. In this manner, the lug 131 will be continuously and firmly held in engagement with the stop-lug 158, and the feed bar 119 and feed carriage 115 will be immovably held against any longitudinal displacement, thus maintaining the advanced stack of books 25 or other sheets in accurate cutting position until said stack is firmly and immovably clamped against the cutting bed by the clamp 26. Accurate positioning of the stack of books 25 or other sheets and accurate trimming of said stack is thus always assured. Preferably, the feed bar 119 is decelerated to a gradual stop against the stop-lug 158 by suitable checking means to be hereinafter described.

It will be apparent that for all sizes of books or other sheets capable of being handled in the trimmer, the stroke of the feed bar 119 is constant and is equal to the distance between the rear edge of the stop-lug 158 and the front edge of the lug 131 with the feed bar 119 in its rearmost normal position, and that for different lengths of books or other sheets the feed carriage 115 is adjusted relative to the feed bar toward or away from the front knife 27 of the trimmer so that the distance between said knife and the front edge of the stack of books or other sheets placed against said feed carriage is equal to the stroke of the feed bar 119 minus the amount of trim to be removed from the front edge of said stack.

As the stack of books 25 or other sheets is being advanced along the feed table 24 toward the trimmer by the feed carriage 115, as above described, the clamp 26 and knives 27, 28 and 29 are in their normal raised positions, shown in Fig. 3, to permit movement of said stack thereunder, and the clutch 54 of the trimmer is in disengaged condition so that the trimmer motor 41 is ineffective to rotate the shaft 53 and cause operation of said clamp and said knives. Hence, during feeding movement of a stack of books 25 or other sheets into the trimmer, said trimmer is totally inoperative. However, when the advancing stack of books 25 or other sheets arrives in position for the performance of the clamping and cutting operations thereon, and the feed carriage 115 is stopped through engagement of the lug 131 with the stop-lug 158, as above described, the clutch 54 is engaged to connect the trimmer motor 41 to the shaft 53 to effect rotation of said shaft and operation of the clamp 26 and knives 27, 28 and 29, whereupon the stack of books 25 or other sheets is firmly clamped against the cutting bed by said clamp and is trimmed by said knives at the front and both sides thereof. This engagement of the clutch 54 and control of the trimmer is, in accordance with another aspect of the present invention, automatically effected by and through forward stack feeding movement of the feed bar 119 so that the trimmer is operative only when a stack of books 25 or other sheets is delivered thereto and is positioned in accurate relation with respect to the clamp 26 and knives 27, 28 and 29.

For this purpose, the clutch control shaft 60 has secured thereto a second clutch control arm 159 (Figs. 2, 3, and 7) which normally extends upwardly and rearwardly from said shaft in advance of the stop-lug 158 and into the path of forward movement of the lug 131 on the feed bar 119. It will thus be apparent that when the stack of books 25 or other sheets is advanced along the feed table 24 by the feed carriage 115, and as said stack approaches clamping and cutting position, the second clutch control arm 159 will be engaged by the lug 131 on the advancing feed bar 119 and through continued forward movement of said bar and lug will be swung in a clockwise direction as viewed in Fig. 7 until the lug 131 engages the stop-lug 158, thus imparting corresponding rotation to the clutch control shaft 60. The clutch control arms 62 and 159 are so relatively proportioned that such swinging movement of the arm 159 by the lug 131 will cause the clutch control bar 63 to release the inner clutch member 56, as previously described, substantially at the same time that the lug 131 engages the stop-lug 158 and the stack of books 25 or other sheets is stopped in accurate clamping and trimming position, whereupon the trimmer is immediately and automatically set into operation and the stack of books 25 or other sheets is clamped by the clamp 26 and trimmed by the knives 27, 28 and 29, as previously described.

When the carriage 115 is returned to its original stack receiving position through rearward movement of the feed bar 119, as hereinafter described, the clutch control arm 159 is released by the lug 131, whereupon said arm, the clutch control shaft 60, the clutch control arm 62 and the clutch control bar 63 are returned to their original positions, shown in Figs. 3, 6 and 7, by suitable resilient means, such as an extension coil spring 160 having one end thereof connected to the bracket 61 and the opposite end thereof connected to a pin 161 which is suitably secured in the arm 159. When the stack of books 25 or other sheets has been trimmed by the knives 27, 28 and 29 and said knives and the clamp 26 have been raised to their original positions, at which time the shaft 53 has completed one revolution, the clutch 54 is again disengaged by the clutch tripping arm 67 and, hence, the trimmer is again thrown out of operation and remains inoperative until the next or succeeding stack of books 25 or other sheets is advanced by the feed carriage 115 into accurate clamping and cutting position and engagement of said clutch is again automatically effected by the feed bar 119 as above described.

The feed carriage 115 is held, through continued operation of the motor 152, in advanced position with the stack of books 25 or other sheets in accurate clamping and cutting position, and with the lug 131 on the feed bar 119 engaged with the stop-lug 158, until the clamp 26 of the trimmer descends and firmly clamps the advanced and accurately positioned stack against the cutting bed. The feed carriage 115 is then rapidly returned to its original starting position on the feed table 24 so that a succeeding stack of books 25 or other sheets may be placed in feeding position on said table against said carriage while the trimming operations are being performed by the knives 27, 28 and 29 on the preceding clamped stack of books 25 or other sheets. In this manner, a succeeding stack of books 25 or other sheets may be prepared for feeding into the trimmer by the feed carriage 115 just as soon as the trimmer has completed one cycle of operation on a preceding stack and the clamp 26 and knives 27, 28 and 29 have been raised to their original inoperative positions.

This return movement of the feed carriage 115 immediately after the advanced stack of books 25 or other sheets is firmly clamped against the cutting bed by the clamp 26 is automatically effected upon rotation of the clamp-actuating cam 85 and operation of two electrical switches 162 and 163 (Fig. 3) in succession by said cam. Actuation of the switches 162, 163 in succession by the cam 85 occurs within the first ninety degrees of rotation of said cam within which time the clamp 26 has been moved downwardly by the springs 87 into firm clamping engagement with the advanced stack of books 25 or other sheets.

The switches 162, 163 are of the well-known roller lever arm actuator type and are mounted on and at opposite sides of a bracket 164 (Figs. 2 and 3) such that their respective rollers 165 and 166 are disposed in the path of rotation of the cam 85 defined by the broken line circle indicated at 167 in Fig. 3 of the drawings, and that the roller 165 of switch 162 will be engaged first by the cam 85. The switch 162 is a normally closed switch, and the switch 163 is a normally open switch, and as illustrated in Fig. 14, said switches are connected in the electrical control circuit for the motor 152. The bracket 164 is adjustably secured to the side frame 20 and projects inwardly from said frame. The switch 162, when actuated or opened by the cam 85, is adapted to break the electric circuit for the motor 152 and thus stop said motor, and the switch 163, when actuated or closed by the cam 85 immediately after actuation of switch 162, is adapted to complete a reversing circuit for the motor 152 which again starts said motor so that it rotates in a direction reverse to that in which it was rotated to impart forward feeding movement to the feed carriage 115 and the stack of books 25 or other sheets.

It will thus be apparent that immediately after the advanced stack of books 25 or other sheets is firmly clamped against the cutting bed by the clamp 26 effected through rotation of the cam shaft 53 and the cam 85 thereon, the switch 162 is actuated or opened by the cam 85 and immediately thereafter the switch 163 is actuated or closed by said cam. Under these conditions, the motor 152 will first be stopped and immediately restarted, but rotated in the reverse direction, whereupon the feed bar 119 and the feed carriage 115 will be rapidly moved rearwardly away from the clamped stack of books 25 or other sheets by the motor 152 through the chain 133 and the friction slip clutch 141. This rearward or return movement of the feed bar 119 and the feed carriage 115 by the motor 152 continues until said bar engaged and actuates a pin 168 (Figs. 2 and 7) and engages the cushion pad 130, whereupon the feed bar 119 and the feed carriage 115 are stopped by said pad in their original starting positions to receive a new or succeeding stack of books 25 or other sheets, and the motor 152 is automatically stopped. The return movement of the feed bar 119 and the feed carriage 115 to starting positions is sufficiently rapid so that said movement occurs while a preceding advanced stack of books 25 or other sheets is being trimmed and before one cycle of operation of the trimmer is completed.

Automatic stopping of the motor 152 substantially at the same time that the feed bar 119 engages and stops against the cushion pad 130 is effected by the pin 168, and for this purpose, said pin is guided for axial sliding movement by the bracket 129 and a block 169 (Fig. 7) which is suitably secured to a shelf 170 that spans the bearing extensions 139, 140 and is bolted or otherwise suitably secured to said extensions at the top thereof. Secured to the pin 168 is a tapered sleeve 171 which is adapted to engage the roller 172 of a normally closed roller lever arm actuator switch 173 which is suitably secured to the shelf 170 and is a duplicate of the switch 162. The pin 168 is yieldingly urged forwardly toward the feed bar 119 by a compression coil spring 174 surrounding said pin and having one end thereof engaging against the block 169 and the opposite end engaging against the sleeve 171. As illustrated in Fig. 14, the switch 173 is connected in the electrical reversing circuit for the motor 152.

It will thus appear that when the feed bar 119 is moved forwardly away from the pad 130 in the feeding of a stack of books 25 or other sheets into the trimmer, the pin 168 is also moved forwardly by the spring 174, thus moving the sleeve 171 in the same direction out of engagement with the roller 172 and allowing the switch 173 to close, and projecting the forward end of said pin beyond the pad 130. The forward movement of the pin 168 is limited through engagement of the sleeve 171 with the bracket 129. When the feed bar 119 is returned to its original starting position after delivering a stack of books 25 or other sheets into the trimmer, as previously described, said bar will engage the projecting forward end of the pin 168 and slide the latter rearwardly until the bar engages and stops against the pad 130, thus moving the sleeve 171 in the same direction into engagement with the roller 172. The switch 173 is thus opened, thereby stopping the motor 152. The motor 152 will then remain stopped until such time that the switch 157 is again closed by the operator to start said motor in the original direction and thereby operate the feed carriage 115 by the feed bar 119 to feed the next or succeeding stack of books 25 or other sheets into the trimmer.

It will be apparent that with the construction thus far described, if the rapidly moving feed carriage 115 is abruptly stopped, as will occur when the lug 131 on the forwardly moving feed bar 119 engages the stop-lug 158, the inertia at the moment of impact will cause the stack of books 25 or other sheets to move forwardly away from said carriage with the result that the front trim or cut will not be made in the proper place on said stack and, hence, the entire stack of books or other sheets will be ruined and will have to be discarded. In order to avoid this abrupt stopping of the feed carriage 115 and resulting forward displacement of the stack of books 25 or other sheets, checking means is provided, in accordance with another aspect of the present invention, for checking or decelerating the movement of the feed bar 119 as the feed carriage 115 approaches stack clamping and cutting position. In this manner, the carriage 115 may be brought to a gradual stop and the lug 131 is caused to gently eengage the stop-lug 158 so that the stack of books 25 or other sheets remains in contact with said carriage, thus assuring accurate longitudinal positioning of the stack with respect to the front knife 27.

As best illustrated in Fig. 7, said checking means comprises an outer cylinder 175 which is suitably secured to the underside of the cutting bed frame member 22 by means of an angle bracket 176 which is welded or otherwise suitably secured to said cylinder. Disposed within the outer cylinder 175 and suitably secured thereto is an inner cylinder 177 which is spaced from said outer cylinder to provide an annular well or reservoir 178 therebetween for a supply of checking fluid, such as oil. Slidably fitted in the open upper end of the inner cylinder 177 is a piston or plunger 179 which is formed with a cone-shaped lower end 180. The piston 179 is yieldingly urged upwardly by a compression coil spring 181 disposed within the inner cylinder 177 and having one end thereof engaging against said piston and the opposite end engaging against the bottom wall of said cylinder. Formed in the side wall of the inner cylinder 177 in horizontal alignment with the cone-shaped lower end 180 of the piston 179 are restricted ports or passages 182 through which the fluid in the inner cylinder is expelled or forced by the piston upon downward movement of said piston under the influence of an abutment 183 in the form of a screw which is adjustably threaded in an arm 184 and is locked in adjusted position by a lock nut 185. The arm 184 is fixed on the clutch control shaft 60 adjacent the second clutch control arm 159. If desired, the arms 159 and 184 may be cast as a single bell crank lever.

It will be noted that as the piston 179 is moved downwardly by the arm 184, the liquid space surrounding the lower end of said piston is gradually constricted adjacent the ports 182 so that flow therethrough is gradually throttled to retard downward movement of the piston. When the piston 179 is moved in an upward direction by the expanding action of the spring 181, the fluid is drawn from the reservoir 178 through ports 186 and 187 formed in the lower end of the inner cylinder 177. The port 186 is normally closed by an inwardly opening spring-pressed ball check-valve 188 which is carried by the inner cylinder 177 and is located between said port and the port 187. The outer cylinder 175 is vented through ports 189 and is provided with a suitable fitting 190 through which the fluid may be introduced into the reservoir 178.

It will thus appear that in the feeding of a stack of books 25 or other sheets by the feed carriage 115 into clamping and cutting position, when the second clutch control arm 159 is engaged by the lug 131 on the forwardly moving feed bar 119 and is swung in a clockwise direction, as viewed in Fig. 7, by said lug to rotate the clutch control shaft 60 in the same direction and thereby inaugurate the operation of the trimmer, as hereinbefore described, the arm 184 is also swung in the same direction, thus moving the piston 179 downwardly. This downward movement of the piston 179 by the arm 184 is, however, resisted by the fluid in the inner cylinder 177, which must be forced from said cylinder by said piston and will only flow slowly therefrom through the restricted ports 182 into the reservoir 178. This resistance by the fluid to the downward movement of the piston 179 and the slow egress of said fluid from the cylinder 177 effectively operates to oppose the driving force exerted by the friction slip clutch 141, thus checking the rapid movement of the feed bar 119 and the feed carriage 115 and causing said bar and carriage to slow down and come to a gradual stop with the lug 131 gently engaging the stop-lug 158. When the clutch control arm 159 and shaft 60 are returned to their original positions by the action of the spring 160 upon return movement of the feed bar 119 and feed carriage 115 to their original starting positions, as previously described, the arm 184 is likewise restored by said shaft to its original position. Thereupon, the spring 181 raises the piston 179 so that the fluid is drawn from the reservoir 178 into the inner cylinder 177 through the ports 186, 187 to refill said cylinder in readiness for the next stack feeding operation of the feed carriage 115.

The feed carriage 115 is provided with clamping means for holding each stack of books 25 or other sheets against the feed table 24 and the feed bar 119 with sufficient pressure to prevent displacement of the stack relative to said carriage while it is being advanced thereby along said feed table into accurate clamping and cutting position. In accordance with another aspect of the present invention, said clamping means is automatically raised to inoperative position when the feed carriage 115 is returned to its starting position, thus facilitating placing of each stack of books 25 or other sheets beneath the same and in operative engagement with said carriage, and is lowered into clamping engagement with the stack under the control of the operator so that said stack is safely clamped before any feeding movement is imparted thereto by the carriage. As best illustrated in Figs. 1, 2, 3, 7 and 8, said clamping means is constructed, mounted and operated as follows.

Disposed between the side plates 116 of the feed carriage 115 are two identical bell-crank levers 191, the arms of each of which are indicated at 192 and 193. The bell-crank levers 191 are pivotally mounted as at 194 on the side plates 116 of the feed carriage 115. The arms 192 of the bell-crank levers 191 project forwardly and are connected together by a tie bar 195 bolted or otherwise suitably secured thereto. The tie bar 195 has suitably secured to the underside thereof a stack engaging block 196 made of wood or other suitable material. The arms 193 of the bell-crank levers 191 project downwardly and forwardly from the arms 192 and have journalled thereon rollers 197. These rollers 197 project laterally and outwardly from the arms 193 into vertical slots 198 formed in a pair of vertically extending parallel arms 199 which are disposed between the bell-crank levers 191 and the side plates 116 and are pivotally mounted as at 200 on said side plates. The arms 199 are connected together at their lower ends by a tie strip 201 formed integrally with said arms, and said strip is provided with two laterally spaced upwardly projecting lugs 202 to which are connected corresponding ends of two relatively heavy extension coil springs 203. The opposite ends of the springs 203 extend through suitable openings in the plate 117 and are connected to vertically extending pins 204 which are suitably secured in the base plate 118 of the carriage 115.

It will thus appear that the arms 199 are continuously urged in a rearward direction by the springs 203 and that said arms, in turn, continuously urge the bell-crank levers 191 in a downward direction to bring the clamping block 196 into clamping engagement with the top of the stack of books 25 or other sheets, said springs serving to apply the necessary degree of pressure of said block on said stack to hold the latter in contact with the side plates 116 of the carriage 115 and against displacement relative to said carriage during forward movement thereof by the carriage into the trimmer to trimming position. By virtue of the stack clamping means on the feed carriage 115, accurate presentation of each stack of books 25 or other sheets to the trimmer by said carriage is further assured. When a stack of books 25 or other sheets is presented by the feed carriage 115 to the trimmer in accurate trimming position, and the clamp 26 of the trimmer has firmly and immovably clamped said stack against the cutting bed, as previously described, the clamping block 196 on the carriage 115 is drawn from the top of the firmly clamped stack upon return movement of the feed carriage 115 to its original starting position. Thereupon, the arms 199 are swung farther rearwardly by the springs 203, and the bell-crank levers 191 and clamping block 196 are, in turn, swung farther downwardly beyond the normal level of the top of the stack of books or other sheets. The side plates 116 of the feed carriage 115 are provided with a series of spaced openings (not shown) in vertical alignment with the openings 194 so that the bell-crank levers 191 may be pivotally mounted in a selected set of said openings for stacks of books or other sheets of less height than the maximum herein shown.

Secured to or formed integrally with the tie strip 201 of the arms 199 is a finger or pawl 205 (Figs. 7 and 8) which extends downwardly and forwardly at an angle from said strip below the feed bar 119 through the slot 121 in said bar. Disposed below the feed table 24 and extending longitudinally of said table is a square bar 206 which is slidably supported and guided adjacent the forward end thereof by a bracket 207 that is bolted or otherwise suitably secured to the guide bar 127 and projects downwardly from said guide bar. The bar 206 is held against displacement from the bracket 207 by a bottom plate 208 that is bolted or otherwise suitably secured to said bracket. The bar 206 is slidably supported and guided adjacent the rear end thereof by a flanged shelf 209 which is formed on the bearing extension 139, said bar being held in sliding engagement with said shelf by a roller 210 which is rotatably carried by said extension. Engaged over the bar 206 is a bracket 211 which projects upwardly from said bar into the path of return movement of the finger 205 on the feed carriage 115, and has journalled thereon a roller 212 which is adapted to be engaged by said finger. The bracket 211 is adjustable along the bar 206 in accordance with the location of the feed carriage 115 on the feed bar 119 for books or other sheets of different lengths, and said bracket is held against displacement from said bar by a bottom plate 213 which is bolted or otherwise suitably secured to said bracket and is provided with a thumb screw 214 for securing the bracket in the desired position of adjustment thereof.

The bracket 211 is so located on the bar 206 that when the feed carriage 115 is returned to its original starting position, the inclined pawl or finger 205 will engage the roller 212 before the rearwardly moving feed bar 119 engages the cushion pad 130 and will continue to ride on said roller as said feed bar moves into engagement with said pad and is stopped thereby. Under these conditions, the arms 199 will be automatically cammed or swung forwardly about their pivotal axes 200, thus swinging the bell-crank levers 191 upwardly about their pivotal axes 194 and raising the clamping block 196 above the normal level of the stack of books 25 or other sheets, as shown in full lines in Fig. 7, whereby a new or succeeding stack of books or other sheets may be easily and conveniently placed beneath said block by the operator and in feeding engagement with the carriage 115. It will be apparent that when the bar 206 is moved rearwardly or toward the left, as viewed in Fig. 7, to the broken line position thereof after the clamp block 196 has been raised, as above described, and a new stack of books 25 or other sheets has been placed beneath said clamp and in feeding engagement with the feed carriage 115, the bracket 211 will be moved in the same direction to the broken line position thereof, thus releasing the finger 205. Thereupon, the arms 199 are swung rearwardly by the springs 203, resulting in downward swinging movement of the bell-crank levers 191 by said arms, and engagement of the clamp block 196 under spring pressure with the top of the new stack of books 25 or other sheets, as shown in broken lines in Fig. 7.

This rearward movement of the bar 206 is effected under the control of the operator so that the stack of books 25 or other sheets will be safely clamped by the clamp block 196 before any feeding movement is imparted to the stack by the carriage 115. For this purpose, the bar 206 has pivotally connected thereto at the forward end thereof one end of a toggle link 215 (Fig. 7) the opposite end of which is pivotally connected as at 216 to the free end of an upwardly and forwardly extending toggle arm 217. This arm 217 is fixed on the inner end of a transversely extending rock shaft 218 which is journalled adjacent opposite ends thereof in suitable bearings provided in brackets 219 and 220 secured to or formed integrally with the table sections 30 and 31, respectively, at the undersides thereof and projecting downwardly from said sections. Fixed on the outer end of the shaft 218 adjacent the bracket 220 is a double-armed lever 221 (Figs. 1 and 4) having an upwardly and rearwardly extending arm 222 and a downwardly and forwardly extending arm 223. Pivotally connected to the arm 222 of lever 221 is the upper end of a connecting rod 224, the lower end of which is pivotally connected to a foot pedal 225 which is loosely mounted on a short transversely extending shaft 226 that is fixed at one end thereof in the side frame 21. The arm 223 of lever 221 has connected thereto one end of a long extension coil spring 227, the opposite end of which is connected to an angle bracket 228 which is bolted or otherwise suitably secured to the side frame 21.

In the normal forward position of the bar 206, as shown in full lines in Fig. 7, the foot pedal 225 is in raised position, as shown in Fig. 1, and the toggle 215, 217 is in straightened condition to hold said bar against rearward movement upon engagement of the finger 205 on the carriage 115 with the roller 212 on the bracket 211. Assuming now that the feed carriage 115 and feed bar 119 have been returned to their original starting positions, and that the clamp block 196, through engagement of the finger 205 with the roller 212, has been raised and a stack of books 25 or other sheets has been placed beneath said clamp block and in engagement with said carriage. The operator now depresses the foot pedal 225, whereupon the toggle arm 217 is swung rearwardly to the broken line position thereof shown in Fig. 7 through the described operating connections therefor with said pedal, thus breaking the toggle 215, 217 at the knee joint 216 and sliding the bar 206 rearwardly to its broken line position shown in said figure. The bracket 211 is thereby moved in the same direction to the broken line position thereof, and the roller 212 is moved out of engagement with the finger 205. Immediately upon release of the finger 205 in this manner, the springs 203 move the clamp block 196 down into engagement with the top of the stack of books 25 or other sheets which is then clamped between said block and the feed bar 119 and feed table 24.

While the foot pedal 225 is held depressed by the operator, the switch 157 is closed by the operator to start the motor 152 and thereby effect forward feeding movement of the carriage 115, bar 119 and the clamped stack of books 25 or other sheets as previously described. When the carriage 115, bar 119 and stack of books 25 or other sheets have been moved by the motor 152 a short distance from starting position so that the pawl or finger 205 is beyond the range of return movement of the bracket 211 on bar 206, the operator releases the foot pedal 225. Thereupon, the foot pedal 225 is raised by the action of the spring 227 to its original position (Fig. 1), and the toggle arm 217 is swung forwardly to its original full line position (Fig. 7), thus again straightening the toggle 215, 217 and moving the bar 206 and bracket 211 thereon forwardly to their original full line positions shown in Fig. 7. A stop 229 (Figs. 1 and 4) in the form of a bolt and engageable by the arm 222 of the lever 221 is provided for limiting the return forward movements of the bar 206 and arm 217 such that said bar and said arm will be stopped when the toggle comprising the link 215 and arm 217 assume a straightened condition. The stop 229 is adjustably threaded into a block 230 which is secured to or formed integrally with the table section 31 at the underside thereof and projects downwardly from said section. The stop 229 may be locked in adjusted positions by a lock nut 231.

After a stack of books 25 or other sheets has been placed by the operator beneath the raised clamp block 196 and in feeding engagement with the carriage 115, the motor 152 may be started by closing the switch 157 to advance said carriage and said stack toward the trimmer. Under these conditions, the pawl or finger 205 will move out of engagement with the roller 212, whereupon the clamp block 196 will be lowered by the springs 203 into clamping engagement with the stack of books 25 or other sheets while said stack is in motion. This operation of the clamp block 196 during forward feeding movement of the stack of books 25 or other sheets has the disadvantage in that said stack might shift and become displaced before it is clamped by said block, with the result that the stack will not be properly presented to the trimmer and will be improperly trimmed.

In order to overcome this disadvantage and to prevent operation of the motor 152 and feeding of a stack of books 25 or other sheets by the carriage 115 before said stack is safely clamped by the clamp block 196, there is provided a second normally open motor starting switch 232 (Fig. 7) which is connected in series with the push-button switch 157 so that both said switches must be actuated or closed to start the motor 152. The switch 232 is of a known roller arm actuator type and is suitably secured to the underside of the table section 30 in such a position that the roller 233 thereof is disposed in the path of movement of the toggle arm 217 for engagement by said arm when the latter is swung rearwardly to effect actuation of the bar 206 and lowering of the clamp block 196 into clamping engagement with the stack of books 25 or other sheets, such engagement of the roller 233 by the arm 217 occurring at the end of the rearward stroke of said arm. As shown in Fig. 7, the rearward stroke of the arm 217 is in excess of that required to lower the clamp block 196 into clamping engagement with the stack of books 25 or other sheets and, hence, the roller 233 will be engaged by said arm and the switch 232 will be actuated or closed shortly after the stack is clamped by said block. It will thus appear that by virtue of the switch 232, the motor 152 cannot be started prior to engagement of the clamp block 196 with the stack of books 25 or other sheets, and can only be started after such engagement, thus further assuring accurate presentation of said stack to the trimmer. The clamp block 196 having been lowered into clamping engagement with the stack of books 25 or other sheets, and the switch 232 having been closed, through depression of the foot pedal 225 and resulting rearward swinging movement of the toggle arm 217, the operator may now start the motor 152 by actuating or closing the switch 157. Usually, the switch 157 is closed by the operator at the same time that the foot pedal 225 is depressed so that the motor 152 will be started immediately upon closing of the switch 232 by the arm 217.

Referring now to the electrical control circuit illustrated in Fig. 14, the motor 152 is of the three-phase type supplied with current from any suitable source through lead wires 235, 236, and 237. Lead wire 235 is connected by a wire 238 with one terminal of the normally open motor starting switch 232. The other terminal of switch 232 is connected by a wire 239 with one terminal of the normally open motor starting push-button switch 157. The other terminal of switch 157 is connected by a wire 240 with a coil 241 of a magnetic switch 242 which forms part of a conventional reversing controller arranged within a box 243 secured by any suitable means on a panel 244 (Figs. 1 and 4) that is suitably secured to the side frames 20, 21 of the trimmer. The coil 241, in turn, is connected to the lead wire 236 and it will thus appear that when the switches 157 and 232 are closed, as above described, the coil 241 will be energized and actuate the switch 242 to close it in contact with the terminals 245, 246 and 247 of lead wires 235, 236, and 237, respectively. Closing of the switches 157 and 232 starts the motor 152 in the proper direction to impart forward feeding movement to the carriage 115 and stack of books 25 or other sheets, said motor receiving current from lead wires 235, 236 and 237 through wires 248, 249 and 250 which are connected to the switch 242 and to said motor.

The switch 157 having been closed by the operator, is opened as soon as he releases it, thus disconnecting the wires 239 and 240, and the switch 232, having been closed through operation of the foot pedal 225 by the operator, is opened as soon as the operator releases said foot pedal, thus disconnecting the wires 238 and 239. The wire 240, however, connected to the switch 157 and to the coil 241, is also connected to the switch 242 by a wire 251, and when the latter switch is closed, it contacts the terminal 252 of a wire 253 which is connected with one terminal of the normally closed motor stopping switch 162. The other terminal of switch 162 is connected by a wire 254 with the wire 238 which, as previously described, is connected to the lead wire 235. Accordingly, when the switches 157 and 232 are opened, current flows from lead wire 235 through wires 238 and 254, switch 162, wire 253, terminal 252, switch 242 and wires 251 and 240 to the coil 241, thus maintaining current in said coil and holding switch 242 closed, regardless of the opening of switches 157 and 232. The motor 152 will thus continue to operate until the switch 162 is opened by the cam 85 when the trimmer is set into operation and said cam is rotated, as hereinbefore described. Opening of the switch 162 breaks the circuit to the coil 241, whereby said coil is deenergized, the switch 242 is opened, and the motor 152 is stopped. Switch 162 closes when released by the cam 85 but at this time switches 157 and 232 are open and, hence, the switch 242 will not be actuated to start the motor 152.

The motor 152 having thus been stopped, is immediately started again through closing of the switch 163 by the cam 85, as previously explained. Closing of the switch 163 starts the motor 152 so that it rotates in a direction reverse to that in which it was rotated to feed a stack of books 25 or other sheets into the trimmer. In this case, current flows from lead wire 235 through a wire 255, switch 163 and a wire 256 to the coil 257 of a magnetic switch 258 arranged within the box 243, said coil, in turn, being connected to the lead wire 237. It will thus appear that when the switch 163 is closed, coil 257 will be energized, thus actuating switch 258 and closing it in contact with other terminals 259, 260 and 261 of lead wires 235, 237, and 236, respectively. When the switch 258 is closed, current flows to motor 152 from lead wires 235, 236, 237 through wires 262, 263 and 264 which are connected with said switch and with the wires 248, 249 and 250.

The switch 163, like the switches 157, 232, opens when it is released by the cam 85, thus disconnecting the wires 255 and 256. The wire 256, however, connected with switch 163, is also connected by a wire 265 with the switch 258 which, when closed, contacts the terminal 266 of a wire 267 which is connected with one terminal of the switch 173. The other terminal of the switch 173 is connected by a wire 268 with the wire 255 which, as previously described, is connected to the lead wire 235. As previously explained, the switch 173 is open, as shown in Fig. 14, when the feed bar 119 is in its normal rearmost starting position, but is closed immediately upon forward movement of said bar toward the trimmer. Accordingly, the switch 173 having been previously closed, when the switch 163 is released by the cam 85 and opens, current flows from lead wire 235 through wires 255 and 268, switch 173, wire 267, terminal 266, switch 258 and wires 265 and 256 to the coil 257, thus maintaining current in said coil and holding switch 258 closed, regardless of the opening of the switch 163. The motor 152 will thus continue to rotate in the reverse direction to return the feed bar 119 and carriage 115 to their original starting positions, at which time the switch 173 is opened by said bar. Opening of the switch 173 breaks the circuit to the coil 257 so that current will no longer flow through said coil and switch 258 will therefore open, thus disconnecting the motor 152 from lead wires 235, 236 and 237 and stopping said motor. The motor 152 then remains stopped until a new or succeeding stack 25 of books or other sheets is in readiness for feeding into the trimmer, at which time the motor may again be started in its original direction through closing of the switches 157 and 232 by the operator.

A vertically extending side gauge 270 (Figs. 1, 2, 4 and 7) is provided on the feed table 24 for enabling the operator to initially locate each stack 25 of books or other sheets on said table in proper lateral position for accurate trimming of the side edges thereof by the side knives 28 and 29. In the feeding of the stacks of books or other sheets successively into the trimmer, the operator places each stack in proper feeding position on the table 24 with the rear edge of the stack abutting against the side plates 116 of the feed carriage 115 and one side edge of said stack abutting against the side gauge 270, as shown in Fig. 2. In accordance with another aspect of the present invention, the side gauge 270 is automatically moved out of engagement with each stack of books or other sheets before any feeding movement is imparted thereto by the carriage 115. In this manner the side gauge 270 will be clear of the stack of books or other sheets and, hence, will not interfere with the feeding movement thereof, and the crowding of said stack against said gauge and possible displacement thereof by the gauge will be completely avoided, especially when the gauge-abutting edge of the stack is rough or irregular or is not square with the rear carriage-abutting edge thereof. As shown, particularly in Figs. 2, 4 and 7, the side gauge 270 is constructed, mounted and operated as follows.

The side gauge 270 has formed integrally therewith adjacent the lower end thereof a laterally and outwardly projecting slide 271 which is fitted in a bracket 272 for sliding movement relative to said bracket toward and away from stack locating position. The bracket 272 is adjustably secured to the top of the table section 30 by means of a T-bolt 273 for adjustment along and laterally of said table section in accordance with the position of the feed carriage 115 on the feed bar 119 and the size of the books or other sheets being handled. The T-bolt 273 projects upwardly through a slot 274 formed in and extending lengthwise of the table section 30, and through a slot 275 formed in and extending lengthwise of the bracket 272 and has threaded thereon a wing nut 276 for releasably clamping said bracket in a desired position of adjustment thereof. Pivotally connected to the outwardly projecting end of the slide 271 of the side gauge 270 is a toggle line 277 which, in turn, is pivotally connected as at 278 to a toggle link 279. The toggle link 279, in turn, is pivotally connected to a lug 280 formed on the bracket 272. Pivotally connected to the toggle links 277, 279 at the knee joint 278 is one end of a link 281, the opposite end of which is pivotally connected to the movable core 282 of a solenoid 283 which is horizontally disposed and is suitably secured to the bracket 272 for movement therewith to various positions on the table section 30.

The side gauge 270 is normally disposed in its inner stack-locating position, as shown in Fig. 2, at which time the solenoid 283 is deenergized and the toggle links 277, 279 are in straightened condition effected by an extension coil spring 284 and engagement of said links with an adjustable stop-pin 285 suitably secured in the bracket 272. The spring 284 has one end thereof connected to the link 277 and the opposite end connected to the bracket 272. With the toggle links 277, 279 in straightened condition, outward lateral movement of the side gauge 270 is prevented by said links when a stack 25 of books or other sheets is placed by the operator on the feed table 24 in feeding position against said side gauge. It will thus be apparent that when the solenoid 283 is energized the core 282 is drawn rearwardly, thereby breaking the toggle 277, 279 at the knee joint 278 and sliding the side gauge 270 laterally relative to the bracket 272 out of engagement with the stack of books or other sheets so that said side gauge is clear of said stack. When the solenoid 283 is thereafter deenergized, the toggle 277, 279 is again straightened against the stop pin 285 by the contracting action of the spring 284, thereby returning the side gauge 270 to its original stack-locating position.

If desired, the solenoid 283 may be included in the electrical control circuit for the motor 152 and controlled by either the switch 157 or the switch 232 so that when both said switches are closed to effect rotation of said motor and feeding movement of the carriage 115 and stack 25 of books or other sheets, the solenoid will be energized and the side gauge 270 will be moved out of engagement with said stack simultaneously with the forward movement of the stack. However, in order to avoid the use of the high motor voltage and thereby prolong the life of the solenoid 283, and at the same time effect disengagement of the side gauge 270 from the stack of books or other sheets before any feeding movement is imparted to said stack, the solenoid is, in the illustrated embodiment, controlled by a separate switch 286 (Fig. 7) so that said solenoid may be independently actuated and may be connected to a use circuit of lower voltage, such as the ordinary light line.

The switch 286 is normally open and is of the known roller lever arm actuator type. The switch 286 is suitably secured beneath the feed table 24 to the guide bar 127 such that the roller 287 of said switch is disposed in the path of rearward movement of an actuating block 288 which is secured to the bar 206. The switch 286 is so spaced longitudinally from the block 288 that when the foot pedal 225 is depressed by the operator and the bar 206 is thereby moved rearwardly, said block will engage the roller 287 and actuate or close said switch substantially at the same time that the clamp block 196 on the carriage 115 is engaged with the stack 25 of books or other sheets, or immediately thereafter, which occurs before the toggle arm 217 has moved its full stroke to close the motor starting switch 232 and start the motor 152. Accordingly, the solenoid 283 will be energized and the side gauge 270 will be moved out of engagement with the stack of books or other sheets before the motor 152 is started to impart feeding movement to said stack.

When the foot pedal 225 is released by the operator and the bar 206 is returned to its original position after the stack 25 of books or other sheets and the feed carriage 115 have been advanced a short distance beyond the side gauge 270, the block 288 is moved out of engagement with the roller 287, thus permitting the switch 286 to open. Opening of the switch 286 breaks the current to the solenoid 283, whereupon said solenoid is deenergized, the toggle 277, 279 is straightened by the spring 284, and the side gauge 270 is returned by said toggle to its original stack-locating position.

In order to further protect the operator against possible injury during the normal operation of the trimmer, a novel safety tunnel 289 (Figs. 1, 2, 3, and 4) is provided at the rear or entrance side of the trimmer through which the feed carriage 115 and stack 25 of books or other sheets must pass to reach trimming position. The tunnel 289 prevents the operator, as well as other persons, from gaining access to the knife or trimming area from the rear side of the machine during the normal operation of the trimmer. The tunnel 289 rests on the feed table 24 and extends substantially across the entire width of said table and is positioned close to the side frames 20, 21 of the trimmer. The side walls of the tunnel 289 are formed at their lower ends with outwardly bent flanges 290 which engage the feed table sections 30 and 31. The front of the tunnel 289 is open, the rear of said tunnel is closed except for a suitable size opening to permit the maximum size stack of books or other sheets to pass therethrough, and the top of the tunnel is formed of expanded metal to enable the operator to observe the movement of each stack through said tunnel and the location of said stack with respect to the clamp 26 and side knives 28, 29, as well as the operation of said clamp and knives. The tunnel 289 is positioned and held in the described location by two pegs 291 (Figs. 1, 2, and 4) which are suitably secured to the flanges 290 and project downwardly from said flanges into suitable openings 292 (Fig. 15) formed in and extending vertically through the table sections 30 and 31.

Pivotally mounted as at 293 on the table section 31 is an arm 294 (Figs. 1 and 4) provided with a pin 295 which projects upwardly from said arm into the adjacent opening 292 for one of the pegs 291 on the tunnel 289, said pin being adapted to be engaged and moved downwardly by said peg when said tunnel is properly positioned on the feed table 24 and the pegs 291 are engaged in the openings 292. Downward movement of the pin 295 results in downward pivotal movement of the arm 294 which is arranged to engage the roller 296 of a normally open switch 297 and close said switch. The switch 297 is suitably mounted on an angle bracket 298 which is bolted or otherwise suitably secured to the table section 31. The switch 297 is a duplicate of the switch 232 and is connected in the electrical circuit to the trimmer motor 41 so that when the switch 297 is open, said circuit will be broken, and when closed, said circuit will be completed.

It will thus appear that the initial starting of the motor 41 and subsequent operation of the trimmer, is dependent upon the closing of the safety switch 297 and, hence, the tunnel 289 must be located in proper position on the feed table 24 with the pegs 291 engaged in the openings 292 to cause said closing of said switch through downward movement of the arm 294 by one of said pegs. Then and only then can the motor 41 be started. If, for any reason, the tunnel 289 is displaced from proper safety position on the feed table 24 and the pegs 291 are withdrawn from the openings 292, the arm 294 will be released, thus permitting the switch 297 to open. Opening of the switch 297 breaks the circuit to the motor 41. Accordingly, the motor 41 cannot be accidentally started while the tunnel 289 is in displaced position and while the operator is making necessary adjustments or repairs to or in the vicinity of the clamp 26 and knives 27, 28, and 29, from the rear side of the trimmer, and will be automatically stopped if said tunnel is removed for any reason from safety position on the feed table 24 at any time during the normal operation of the trimmer.

After a stack 25 of books or other sheets has been trimmed at the front and both sides thereof and the clamp 26 and knives 27, 28 and 29 have been raised to their original inoperative positions, thus completing one cycle of operation of the trimmer, the trimmed stack remains on the cutting bed until a succeeding untrimmed stack 25 of books or other sheets is moved by the carriage 115 into clamping and trimming position, whereupon said trimmed stack is discharged from the trimmer onto a delivery conveyor, to be hereinafter described, by and through forward movement of said succeeding stack into trimming position. This removal of each preceding trimmed stack of books or other sheets by each succeeding untrimmed stack is utilized to sweep or remove the trimmings or shavings cut from each preceding stack by the knives 27, 28 and 29 from the cutting bed and discharge the same onto the delivery conveyor from which they may be easily removed. For this purpose, novel means is provided for deflecting the side trimmings or shavings cut from each stack of books or other sheets by the side knives 28 and 29 toward the trimmed sides of said stack and for confining said shavings close to said stack sides so that when a succeeding stack of books or other sheets is moved into trimming position, said succeeding stack, being untrimmed and, hence, wider than the preceding trimmed stack, will engage and sweep the shavings from the cutting bed at the same time that the trimmed stack is removed from said bed and discharged onto the delivery conveyor. When each trimmed stack of books or other sheets and the side shavings cut therefrom are removed from the cutting bed and discharged onto the delivery conveyor, as described, the trimmings or shavings cut from the front of said stack by the front knife 27 are also swept onto said delivery conveyor by and through forward movement of said trimmed stack.

As shown, particularly in Fig. 11, said shaving deflecting means comprises two vertically extending plates 299 which are mounted on and adjustable laterally with the side cutting stick holders 33 and 34. The plates or deflectors 299 are formed with intermediate and lower portions which are inclined upwardly and outwardly at different inclinations so as to deflect the side shavings from each stack 25 of books or other sheets toward the trimmed sides of said stack and to cause said shavings to fall in a pile between the stack and said plates onto the holders 33, 34 and the cutting sticks 36 and 37. The deflectors 299 extend the full length of the cutting stick holders 33, 34 and they may, if desired, be rigidly secured to said holders. However, in order to avoid bending or damaging of the deflectors 299 when excessive portions are cut from the sides of a stack of books or other sheets, resulting in a substantial increase in the size and pile of shavings, each of said deflectors is made in the form of a hinge, the lower part of which is rigidly bolted or otherwise suitably secured to the respective cutting stick holder. The loose upper part of each deflector 299 is yieldingly urged toward the stack of books or other sheets and is yielding held in deflecting position by a curved spring-pressed rod 300 having one end thereof pivotally connected as at 301 to said upper part. The opposite end of the rod 300 extends loosely through a suitable opening in a lug 302 which is formed on the rigid lower part of the deflector 299. A compression coil spring 303 surrounds the rod 300 and has one end thereof engaging against the head of said rod and the opposite end engaging against the fixed lug 302. Inward movement of each deflector 299 by the spring-pressed rod 300 is limited to the position shown in Fig. 11 by a stop-nut 304 or the like which is threaded on the lower projecting end of said rod and engages against the fixed lug 302.

As stated above each trimmed stack 25 of books or other sheets is discharged from the trimmer onto a delivery conveyor by and through forward movement of a succeeding stack of untrimmed books or other sheets into trimming position. This delivery conveyor, indicated generally at 305 (Figs. 1, 1a, 2, 3, 3a, 5 and 9) extends forwardly from the front or discharge side of the trimmer and is of substantial length so that it may receive, support and convey a number of trimmed stacks of books or other sheets to a safe point remote from the trimmer for removal therefrom by an attendant, the shavings or trimmings also discharged onto said conveyor being permitted to drop therefrom at the forward end thereof into a basket or other receptacle provided for this purpose. As will hereinafter appear, the delivery conveyor 305 is, in accordance with another aspect of the present invention, so arranged that it may be easily and conveniently moved bodily away from the trimmer and without disturbing the operating means therefor to enable the operator to gain access to the front side of the trimmer for the purpose of making necessary repairs and adjustments, and particularly for adjusting the side cutting stick holders 33, 34 and for replacing worn out cutting sticks 35, 36 and 37.

As shown, particularly in Figs. 1a, 3, 3a, 5 and 9, the delivery conveyor 305 comprises a relatively long and wide endless belt 306 having its upper reach positioned in horizontal alignment with the cutting bed and the feed table 24, and resting on a relatively wide table 307 which extends substantially the entire length of said belt. The table 307 is formed from sheet metal and is provided with downwardly inturned sides which are engaged over and suitably secured to angle iron side frame members 308 and 309. The side frame members 308, 309 extend beyond the opposite ends of the table 307 and are connected together at their rear ends by a tie bar 310 bolted or otherwise suitably secured thereto.

The conveyor 305 is supported adjacent the rear end thereof for sliding movement away from the trimmer on flanged rollers 311 which are engaged by the side frame members 308, 309. The rollers 311 are journalled on studs 312 suitably secured in vertically extending side plates 313 and 314 which are disposed interiorly of and adjacent to the side frames 20 and 21, respectively, of the trimmer. The plates 313, 314 are engaged over and supported by two parallel shafts 315 and 316 which extend transversely of the trimmer, the shaft 315 being fixed in the side frames 20, 21, and the shaft 316 being journalled in suitable bearings in said side frames for a purpose to appear hereinafter. The side plates 313, 314 are connected together and held in spaced relation by a tie rod 317 which is secured thereto by nuts 318 threaded on said rod and tightened against opposite faces of said plates.

The conveyor 305 is supported adjacent the front thereof by a stand comprising two uprights or legs 319 which are pivotally connected as at 320 to the side frame members 308, 309. The lower ends of the legs 319 are pivotally connected as at 321 to base-brackets 322 which, in turn, are bolted or otherwise suitably secured to the machine foundation. The legs 319 are connected together by an X-brace 323 bolted or otherwise suitably secured thereto. It will thus appear that by virtue of the described mounting for the conveyor 305, including the flanged rollers 311 and the pivotal stand 319, 323, said conveyor comprising the side frame members 308, 309, tie bar 310, table 307 and belt 306 thus far described, and other parts to be presently described, may be easily and conveniently moved away from the trimmer to enable the operator to gain access to the front side of said trimmer.

The rear portion of the belt 306 passes around an idler roller 324 which extends transversely of the conveyor 305 and is journalled in suitable bearings provided in blocks 325 bolted or otherwise suitably secured to the inner surfaces of the side frame members 308, 309. The front portion of the belt 306 passes around a driven roller 326 and also over a return idler roller 327, which extend transversely of the conveyor 305. The idler roller 327 is journalled at opposite ends thereof in suitable bearings provided in hanger plates 328 which are bolted or otherwise suitably secured to the inner surfaces of the side frame members 308, 309 and project downwardly beyond said members. The driven roller 326 is keyed or otherwise suitably secured to a transversely extending shaft 329 which projects beyond opposite ends of said roller and has its opposite ends journalled in suitable bearings provided in vertically extending plates 330. These plates 330 are engaged over and slidably supported by two longitudinally extending rails 331 which are located directly beneath the side frame members 308, 309. The rear ends of the rails 331 are bolted or otherwise suitably secured to the outer surfaces of the hanger plates 328, and the front ends of said rails are bolted or otherwise suitably secured to the outer surfaces of other hanger plates 332 which are bolted or otherwise suitably secured to the inner surfaces of the side frame members 308, 309.

The side frame members 308, 309 have portions thereof removed, as indicated at 333, to receive the bearing plates 330, and said plates are connected together in spaced relation and held against displacement from the rails 331 by a transversely extending plate 334 which is bolted or otherwise suitably secured to the lower ends of the plates 330. The connecting plate 334 has a portion 335 thereof projecting outwardly beyond one of the plates 330, which provides a suitable platform or support for a speed reduction drive unit 336 which includes an electric motor 337 coupled thereto and forming a part thereof. The electric motor 337 is connected with a suitable source of electrical current and is controlled for starting and stopping purposes by suitable switch means (not shown).

The electric motor and speed reduction drive unit 337, er 326 and, in turn, the belt 306 continuously and at a slow speed. For this purpose, the output shaft 338 of the speed reduction drive unit 336 has fixed thereon a spur pinion 339 which meshes with and drives a spur gear 340 that is keyed or otherwise suitably secured to the shaft 329 of the belt roller 326.

Suitably secured in the hanger plates 332 and projecting inwardly from said plates are headed studs 341 through which loosely extend threaded rods 342 which also loosely extend through headed studs 343 that are suitably secured in the bearing plates 330. The rods 342 have threaded thereon nuts 344 which are held against rotation with said rods by the bearing plates 330. The rods 342 are provided on their outer ends with hexagon heads 345 to receive a wrench for rotating said rods. It will thus be noted that by virtue of the described mounting for the belt roller 326 and the speed reduction drive unit 336, 337, said roller, together with said unit, may be adjusted longitudinally of the conveyor 305 through rotation of the rods 342 in the proper direction to take up slack in the belt 306 as desired, and said conveyor may be moved away from the trimmer without disconnecting or disturbing the driving means therefor. The space between the cutting bed and the rear or receiving end of the conveyor 305 is bridged by an apron 346 when said conveyor is in operative stack-receiving position, said apron being suitably secured to the tie bar 310 and serving to guide the trimmed stacks of books or other sheets onto said conveyor.

Means are provided for operation by the operator for easily and conveniently moving the conveyor 305 toward and away from the trimmer and for holding said conveyor in operative and displaced positions, said means comprising a rock shaft 347 (Figs. 1, 3, and 9) which extends transversely of the conveyor below the side frame members 308, 309 and is journalled at opposite ends thereof in suitable bearings in the side plates 313, 314. Fixed on the shaft 347 between and adjacent to the side plates 313, 314 are toggle arms 348 having pivotally connected thereto as at 349 corresponding ends of toggle links 350. The toggle links 350, in turn, are pivotally connected as at 351 to the bearing blocks 325 on the conveyor side frame members 308, 309. Disposed exteriorly of and adjacent to the side plate 313 is a handle 352 which is suitably secured to the rock shaft 347 and is provided with a manipulating knob 353 suitably secured thereto. The handle 352 is further provided with a spring-pressed plunger 354 (Fig. 10) which is adapted to be engaged in one or the other of two clearance openings 355 and 356 formed in the side plate 313. The plunger 354 has secured thereto a knob 357 for withdrawing said plunger from the engaged opening 355 or 356.

When the conveyor 305 is located in stack-receiving position, as shown in the drawings, the handle 352 is disposed in the full line position thereof shown in Fig. 1, the plunger 354 is engaged in the opening 355 and the toggles comprising the arms 348 and links 350 are in straightened condition (Fig. 3), thus locking said conveyor in stack-receiving position and preventing forward displacement thereof from the trimmer. When the plunger 354 is withdrawn from the opening 355 and the handle 352 is swung in a clockwise direction, as viewed in Fig. 1, to the broken line position thereof by the operator, at which time the plunger 354 snaps into the opening 356, the shaft 347 and toggle arms 348 thereon are rocked in the same direction, thus breaking the toggles 348, 350 at the knee joints 349 and bodily sliding the conveyor 305 forwardly on the rollers 311 away from the trimmer a sufficient distance to enable the operator to easily and conveniently adjust the side cutting stick holders 33, 34 and remove and replace worn out cutting sticks 35, 36, and 37. Engagement of the plunger 354 in the opening 356 thus locks the conveyor 305 in displaced position and against further forward movement, as well as against return movement.

The necessary adjustment, repairs and/or replacements having been made, the operator withdraws the plunger 354 from the opening 356 and swings the handle 352 in a counter-clockwise direction (Fig. 1) from its broken line position until said plunger snaps into the opening 355, whereupon the toggles 348, 350 are again straightened, thus moving the conveyor 305 rearwardly to stack-receiving position and locking said conveyor in said position. It will be noted that the conveyor 305 may be moved at any time away from the trimmer by merely actuating the handle 352, as described, and without disconnecting any elements of said conveyor, without disconnecting or disturbing the driving means therefor and without stopping the conveyor belt 306. Accordingly, the conveyor belt 306 may continue in operation to advance any stacks of books or other sheets remaining thereon to the point of removal therefrom while the conveyor 305 is being moved away from the trimmer and while it is in displaced position.

In order to still further protect the operator against possible injury during the normal operation of the trimmer, a novel safety tunnel 358 (Figs. 1, 2, 3, and 9) is provided at the front or delivery side of the trimmer through which the successive trimmed stacks of books or other sheets must pass in the movement thereof from the trimmer along the conveyor 305. This tunnel 358 prevents the operator, as well as other persons, from gaining access to the knife or trimming area from the front side of the machine during the normal operation of the trimmer. The tunnel 358 rests on the delivery table 307 and extends substantially across the entire width of said table and is positioned close to the side frames 20, 21 of the trimmer. The side walls of the tunnel 358 are formed at their lower ends with outwardly bent flanges 359 and 360, the flange 360 engaging the table 307, and the flange 359 engaging an angle iron bracket 361 which is bolted or otherwise suitably secured to the top of said table and extends longitudinally thereof. The front and rear ends of the tunnel 358 are open, and the top of said tunnel is formed of expanded metal to enable the operator to observe the movement of the trimmed stacks of books or other sheets therethrough. The tunnel 358 is positioned and held in the described location by two pegs 362 and 363 which are suitably secured to the flanges 359 and 360, respectively, of said tunel and project downwardly from said flanges. The peg 362 is engaged in a suitable opening 364 formed in the bracket 361, and the peg 363 is engaged in suitable axially aligned openings 365 and 366 formed in the table 307 and adjacent side frame member 309 of the conveyor 305.

Pivotally mounted as at 367 on the side frame member 309 of the conveyor 305 is an arm 368 (Figs. 3 and 9) provided with a pin 369 which projects upwardly from said arm into the opening 366 in said side frame member for the peg 363, said pin being adapted to be engaged and moved downwardly by said peg when the tunnel 358 is in proper position on the delivery table 307 with respect to the trimmer, and the pegs 362 and 363 are engaged in the openings 364 and 365, 366, respectively. Downward movement of the pin 369 by the peg 363 results in downward pivotal movement of the arm 368 which is arranged to engage the roller 370 of a normally open switch 371 and close said switch. The switch 371 is suitably mounted on an angle bracket 372 which is bolted or otherwise suitably secured to the conveyor side frame member 309. The switch 371 is a duplicate of the switch 297 and is connected in series with the latter switch in the electrical circuit to the trimmer motor 41 so that when the switch 371 is open, said circuit will be broken.

It will thus appear that the initial starting of the motor 41 and subsequent operation of the trimmer is further dependent upon the closing of the safety switch 371, and, hence the tunnel 358 must be located in proper safety position on the delivery table 307 with the pegs 362 and 363 engaged in the openings 364, and 365, 366, respectively, to cause said closing of said switch through downward movement of the arm 368 by the peg 363. Then and only then can the motor 41 be started, provided the safety tunnel 289 is also in proper safety position on the feed table 24 and the safety switch 297 is closed thereby, as hereinbefore described. If, for any reason, the tunnel 358 is displaced from proper position on the delivery table 307 and the pegs 362, 363 are withdrawn from their respective openings 364 and 365, 366, the arm 368 will be released, thus permitting the switch 371 to open. Opening of the switch 371 breaks the circuit to the motor 41. Accordingly, the motor 41 cannot be accidentally started while the tunnel 358 is in displaced position and while the operator is making necessary adjustments or repairs to or in the vicinity of the clamp 26 and knives 27, 28 and 29 from the front side of the trimmer, and will be automatically stopped if said tunnel is removed for any reason from proper position on the delivery table 307 at any time during the normal operation of the trimmer.

It will thus be noted that by virtue of the safety tunnels 289 and 358, the operator cannot gain access to the knife or trimming area from either side of the trimmer while said trimmer is in operation, thus protecting the operator against possible injury, and that by virtue of the safety switches 297 and 371 controlled by said tunnels, respectively, the motor 41 of the trimmer cannot be accidentally started when one or the other or both of the tunnels are not in proper safety position, and will be immediately and automatically stopped when one or the other of said tunnels is removed from its safety position while the trimmer is in operation, thus further protecting the operator against possible injury.

When handling stacks of sewed book signatures, each stack will contain a series of vertically aligned knots of thread as indicated at 373 (Fig. 12), on the rear or binding edge thereof, which knots will at times occupy a position directly in alignment with one of the side plates 116 of the feed carriage 115. Under this condition, each stack will be angularly disposed with respect to the feed carriage 115 when placed against the same and, hence, cannot and will not be properly trimmed. In order to compensate for a condition of this character, and to enable handling of sewed book signatures, novel auxiliary or extension gauge means are provided for mounting on the feed carriage 115, said gauge means serving to hold the stack of sewed book signatures away from and square with the side plates 116 of said carriage so that the knots 373 thereon are clear of said plates, and being arranged to engage each stack at positions clear of said knots.

As shown in Figs. 8, 12, and 13, said auxiliary or extension gauge means comprises two vertically arranged short flat bars 374 provided with a plurality of vertically spaced mounting screws 375, three being shown, which are threaded into the vertical edge of each of said bars. The screws 375 are adapted to be engaged in correspondingly spaced horizontal slots 376 formed in vertically arranged angle bars 377 which are normally carried by the feed carriage 115 and are bolted or otherwise suitably secured to the outer surfaces of the side plates 116 adjacent the forward stack-engaging edges thereof. The angle bars 377 are transversely aligned and are so located on the side plates 116 that when the auxiliary gauges 374 are mounted thereon and secured thereto through tightening of the screws 375, the forward edges of said gauges will be transversely aligned and will extend beyond the forward edges of the side plates 116, thus effectively serving to hold a stack of sewed book signatures away from said side plates, and enabling accurate positioning of said stack square with the feed carriage 115 regardless of the knots 373 or other projections thereon. The slots 376 permit lateral adjustment of the auxiliary gauges 374 relative to the supporting bars 377 to desired positions, and said slots open through the outer edges of the angle bars 377 so that the auxiliary gauges 374 may be mounted thereon and removed therefrom without having to remove the screws 375.

The auxiliary gauges 374 are normally removed from the feed carriage 115, but may, if desired, remain thereon for use with the various kinds of books, signatures, sheets and the like that may be handled in the trimmer. For this purpose, the gauges 374 have mounted thereon for floating vertical movement short thin gauge plates 378 which loosely rest on the feed table 24 and serve to prevent individual sheets and the like from sliding beneath said gauges when stacks of such material are being handled in the trimmer. It is pointed out that when handling stacks 25 of books or other sheets of less width than that herein shown, a relatively narrow feed carriage, interchangeable with the feed carriage 115, is employed.

As hereinbefore stated, the trimmer is capable of dividing and trimming stacks of books or other paper material of double width or two-up, as well as stacks of books or other paper material of triple width or three-up. For this purpose, and as shown in Fig. 15, the side cutting stick holder 34 with the shaving deflector 299 removed therefrom is positioned relatively close to the guide bar 128, and the side knife 29 is correspondingly adjusted along the shaft 102 to a position directly above the cutting stick 37 carried by said holder to cooperate therewith. This position of the knife 29 is the starting point in the make-ready of the trimmer for handling relatively wide stacks of books or other sheets two-up and three-up. For relatively narrow stacks of books or other sheets two-up and three-up, the cutting stick holder 34 is moved farther inwardly and placed alongside the guide bar 128, and the side knife 29 is correspondingly adjusted.

The side gauge-supporting bracket 272 is laterally adjusted in the proper direction relative to the feed table 24 so that when a stack 25' of books or other sheets two-up or three-up, as the case may be, is placed on said table and against the side gauge 270, the inner side-trim line of the stack section or half $S^1$ is in direct longitudinal alignment with the cutting edge of the knife 29. This necessitates locating the stack 25' so that the section or half $S^1$ thereof is off-center with respect to the feed bar 119, and requires the use of a feed carriage 115' which, as shown in Fig. 15, is constructed for off-center mounting on said feed bar so as to operatively engage and clamp the stack section or half $S^1$ only of said stack. Since the feed carriage 115', except for the off-center mounting thereof, is identical in construction and operation with the feed carriage 115 hereinbefore described, the corresponding parts thereof have the same reference numerals applied thereto.

The side knife 28 is laterally adjusted along the shaft 102 relative to the side knife 29 to proper position in accordance with the lateral position of the outer side edge of the stack section or half $S^1$ of the stack 25' for performing the trimming operation on said outer side edge. The side cutting stick holder 33 with the shaving deflector 299 thereon is correspondingly adjusted to a position so that the cutting stick 36 carried by said holder is directly below the knife 28 for cooperation therewith. The space, if any, between the cutting stick holder 34 and the guide bar 128 is filled in by a block 40 of proper thickness, and the space between the cutting stick holder 33 and the guide bar 127 is filled in by other blocks 40 of proper thickness. A clamp 26 of the proper size is secured at one side thereof to the holder 76 so that said clamp is properly positioned for clamping engagement with the stack section or half $S^1$ only of the stack 25'. The space between the side cutting stick holder 34 and the adjacent side frame 21 and between the feed table 24 and the apron 346 on the delivery conveyor 305 is bridged by a plate or apron 379 which provides a continuation of the upper surface of the feed table 24 and a support for the stack section or half $S^2$ of the stack 25' before and after the same is divided from the stack section or half $S^1$ of said stack. The plate 379 is bolted or otherwise suitably secured to a bracket 380 which, in turn, is bolted or otherwise suitably secured to the cutting bed frame member 22 (Fig. 16).

The above describes the operations which are necessary in the make-ready of the trimmer for handling stacks 25' of books or other sheets two-up, as well as three-up. Assuming now that these operations have been performed, that a stack 25' of books or other sheets two-up or three-up has been placed in proper feeding position on the feed table 24 and properly jogged against the side gauge 270 and the feed carriage 115', that said stack has been delivered to the trimmer by said feed carriage with the stack section or half $S^1$ accurately positioned with respect to the clamp 26 and knives 27, 28 and 29, and that the trimmer has been set into operation, all in the same manner as hereinbefore described in connection with the handling of stacks 25 of books or other sheets of single width or one-up. The clamp 26 then descends into clamping engagement with the stack section or half $S^1$ of the undivided two-up or three-up stack 25', and then the side knives 28 and 29 simultaneously move downwardly through said stack and into engagement with the respective cutting sticks 36 and 37. Under these conditions, the outer side edge of the stack section or half $S^1$ of the stack 25' is accurately trimmed by the side knife 28, and the stack section or half $S^2$ of said stack is accurately divided by the side knife 29 from the stack section or half $S^1$ on the inner side-trim line of the latter stack, thus producing a semi-finished side-trimmed stack $S^1$ of books or other sheets, and a separate, unfinished, untrimmed stack $S^2$ of books or other sheets. The knives 28, 29 are then raised, and the knife 27 is then lowered into engagement with the cutting stick 35. However, during the interval between raising of the side knives 28, 29 and lowering of the front knife 27, the loose divided stack $S^2$ of books or other sheets is acted upon by novel pusher means which moves said stack rearwardly on the apron 379 out of the path of downward movement of the knife 27 so as to avoid improper cutting of said stack by said knife when the latter descends to trim the front edge of the stack $S^1$ of books or other sheets. After the loose divided stack $S^2$ is moved rearwardly by the pusher means out of the path of the knife 27, said pusher means is retracted out of said path, and then said knife descends to trim the front edge of the side-trimmed stack $S^1$ of books or other sheets and thereby complete the trimming operations thereon. The front knife 27 is then raised to its original position and then the clamp 26 is moved out of engagement with the fully trimmed stack $S^1$ of books or other sheets, as hereinbefore described. The fully trimmed stack $S^1$ and the loose divided untrimmed stack $S^2$ of books or other sheets are then discharged from the trimmer onto the delivery conveyor belt 306 by and through forward feeding movement of a succeeding stack 25' of two-up or three-up books or other sheets into trimming position. In this manner the relatively high hourly output of finished fully trimmed stacks of books or other sheets may be maintained through continued feeding of successive stacks 25' of books or other sheets two-up or three-up into the trimmer, and without interruption for the purpose of removing the untrimmed divided stacks $S^2$ from the apron 379 before a succeeding stack 25' of books or other sheets two-up or three-up can be fed into the trimmer. The divided untrimmed stacks $S^2$ of books or other sheets may then be removed from the conveyor 305 by an attendant and stacked in a carrier to be returned to the feed table 24 for subsequent feeding into the trimmer and performing of the side and front trimming operations thereon by the knives 28, 29 and 27 before or after the supply of two-up or three-up stacks is exhausted and without necessitating any changes in the original arrangement of the clamp 26 and knives 28 and 29.

As shown in Figs. 3, 9, 15 and 16, the novel pusher means comprise the following instrumentalities which are constructed, mounted and operated as follows. Fixed on the cam shaft 53 for rotation therewith is a cam 381 which engages a roller 382 journalled on a stud 383 that is secured in any suitable manner in one arm 384 of a double-armed lever 385, the other arm of which projects upwardly and is indicated at 386. The double-armed lever 385 is pivotally mounted on a transversely extending shaft 387 which is fixed at opposite ends thereof in the side frames 20, 21 of the trimmer. The arm 386 of lever 385 has pivotally connected thereto one end of a connecting rod 388, the opposite end of which is pivotally connected to the upper end of a vertically extending arm 389 which is secured to the shaft 316 adjacent to and inwardly of the side plate 314. Fixed on the shaft 316 adjacent to and inwardly of the side plate 313 is an arm 390 which projects upwardly from said shaft beyond the top of the delivery table 307 through a suitable opening in said table. The arm 390 has connected thereto one end of an extension coil spring 391, the opposite end of which is connected to the adjacent side frame member 308 of the delivery conveyor 305. It will thus appear that the roller 382 is yieldingly urged toward and maintained in engagement with the cam 381 by the contracting action of the spring 391, and that the arm 390, through the described operating connections therefor with said cam, is cam operated in a forward direction by the cam 381, and is spring operated in a rearward direction by said spring action under the control of said cam.

Pivotally connected to the upper end of the arm 390 is one end of a horizontal link 392 (Figs. 9 and 15), the opposite end of which is pivotally connected to a stud 393 which is secured in any suitable manner in a horizontal T-shaped slide and bearing block 394 intermediate the ends of said block. This block 394 is supported and guided for straight line reciprocating movement by two vertically spaced upper and lower elongated gibs 395 and 396, respectively, which are bolted or otherwise suitably secured to the angle bracket 361 carried by the delivery table 307. Pivotally mounted on the stud 393 between the link 392 and the slide block 394 is a stack-pusher arm 397 which projects rearwardly from said stud and has suitably secured thereto at the free rear end thereof a stack engaging pusher or shoe 398. The pusher or shoe 398 projects inwardly from the arm 397 and is of such length that it will only engage the untrimmed divided stack S² resting on the apron 379. Journalled on the pusher arm 397 as at 399 is a roller 400 which is arranged to engage a cam track 401 formed in the upper surface of the lower gib 396. Bolted or otherwise suitably secured to the slide block 394 forwardly of the stud 393 is an upwardly and rearwardly curved bracket 402 having pivotally connected thereto one end of a rod 403. The opposite end of the rod 403 extends loosely through a suitable opening in a laterally and outwardly projecting lug 404 formed integrally with the pusher arm 397. Surrounding the rod 403 is a compression coil spring 405 having one end thereof engaging against the lug 404 and the opposite end engaging against a collar 406 adjustably secured to said rod.

It will thus appear that the roller 400 on the pusher arm 397 is yieldingly held in engagement with the upper surface of the lower gib 396 by the expanding action of the spring 405, and that said arm is yieldingly urged downwardly by said spring action to cause said roller to follow the contour of the cam track 401 and thereby effect lowering of the pusher 398 into engagement with the apron 379. Engagement of the pusher 398 with the upper surface of the apron 379 with a minimum amount of friction may be regulated through the provision of a roller 407 which is adapted to engage and roll along the upper surface of the delivery table 307. This roller 407 is journalled on the lower end of a plate 408 which is adjustably secured to the pusher arm 397.

The pusher 398 normally occupies the full line position thereof shown in Fig. 16, wherein it will be noted that said pusher is spaced forwardly from the front knife 27 of the trimmer, and upwardly from the delivery conveyor 305 a distance sufficient to permit the successive untrimmed divided stacks S² of books or other sheets to freely pass thereunder in the movement of said stacks from the trimmer onto and along said conveyor. In the normal full line position of the pusher 398, the roller 400 is engaged with the upper surface of the gib 396, thus holding said pusher in its raised stack clearing position, and the roller 382 is engaged with the high part of the cam 381, thus holding the pusher in its forward retracted position.

Assuming now that a stack 25' of two-up or three-up books or other sheets has been fed into cutting position, and that the trimmer has been set into operation and the side knives 28, 29 have been moved downwardly into engagement with the respective cutting sticks 36, 37, thereby trimming the opposite sides of the stack section or half S¹ and simultaneously dividing the stack section or half S² from the stack section or half S¹. Thereupon, the roller 382, through continued rotation of the cam 381, rides into the low part of said cam, and the pusher actuating arm 390 is swung rearwardly or in a counter-clockwise direction, as viewed in Fig. 16, by the contracting action of the spring 391. Under these conditions, the pusher arm 397 and the pusher 398 are moved rearwardly by the spring actuated arm 390, and at the same time downwardly through engagement of the roller 400 with the low part of the cam track 401 by the expanding action of the spring 405, until said pusher engages the apron 379 and rides along said apron to the broken line position thereof shown in Fig. 16, thus engaging the untrimmed divided stack S² of books or other sheets resting on the apron 379 and sliding said stack rearwardly beyond the path of downward movement of the front knife 27, as clearly shown in broken lines in Fig. 16. Upon continued rotation of the cam 381, the roller 382 rides out of the low part and onto the high part of said cam, whereupon the pusher 398 is positively retracted or moved forwardly by said cam to its normal position. As the pusher 398 is so retracted, the roller 400 rides up on the cam track 401 and onto the upper surface of the gib 396, thereby simultaneously raising said pusher to its original position so that the untrimmed divided stack S² of books or other sheets may freely pass thereunder upon subsequent movement of said stack from the trimmer onto the delivery conveyor belt 306.

The operation of the pusher 398 is so timed, and the low part of the cam 381 is of such relatively short duration, that said pusher will be advanced into engagement with the untrimmed divided stack section or half S² of books or other sheets on the apron 379 immediately after said stack section is severed from the stack section or half S¹, and will be retracted clear of the front knife 27 while the side knives 28, 29 are being raised and before said front knife begins its downward movement. The pusher 398 will then remain in its retracted and raised positions for the remainder of the cycle of operation of the trimmer and until said trimmer is again set into operation for performing the trimming and dividing operations on a succeeding stack 25' of books or other sheets, at which time the above described operations of the pusher 398 are repeated.

When handling single width or one-up stacks 25 of books or other paper material in the trimmer, the pusher 398 is rendered inoperative and is held in retracted and raised positions so as not to interfere with the movement of the trimmed stacks from the trimmer onto and along the delivery conveyor 305. For this purpose, a pin 409

(Fig. 9) is inserted in an opening 410 (Fig. 16) in the side plate 313 and is disposed in the path of rearward movement of the pusher operating arm 390, as shown in Figs. 1 and 9. This prevents rearward movement of the pusher operating arm 390 and the pusher 398 by the spring 391, and prevents the roller 382 from following the cam 381. The pin 409 is secured to one end of a small link chain 411, the opposite end of which is connected in any suitable manner to the side plate 313.

The foregoing description and accompanying drawings set forth with more or less particularity one embodiment of the present invention, but it is to be expressly understood that said invention is not limited to said embodiment or to the particular type of paper trimmer disclosed herein. Various changes may be made therein, particularly in the design and arrangement of the parts illustrated, as well as in the mode of operation and manner of use, without departing from the spirit and scope of the invention, as will now be clear to those skilled in the art. For example, for further safety in operation and to keep both hands of the operator occupied, a duplicate of the push-button motor starting switch 157 may be arranged in series therewith and located at two widely separated points on the feed table 24, thereby requiring two hands to operate the two switches.

What is claimed is:

1. In a machine of the character described having movable knife means and movable clamp means, at said knife means, for immovably holding a stack of paper material while the same is being trimmed by said knife means, a feed table, a reciprocable feed carriage mounted on said table for feeding stacks of paper material successively into clamping relation with said clamp means, mechanism including a reversible electric motor for reciprocating said carriage, means for supplying current to said motor and comprising a circuit therefor, a manually actuated switch in said circuit for closing the same to thereby start said motor in one direction and effect movement of said carriage and each stack toward said clamp means, a second switch in said circuit automatically actuated when each stack is delivered to said clamp means for breaking said circuit to thereby stop said motor, and a third switch in said circuit automatically actuated when each stack is engaged by said clamp means for closing said circuit to thereby start said motor in the reverse direction and effect return movement of said carriage away from said clamp means.

2. A machine as defined in claim 1, comprising a fourth switch in said circuit automatically actuated when said carriage reaches a predetermined stack receiving position on said feed table for breaking said circuit to thereby stop said motor.

3. In a machine of the character described having movable knife means and movable clamp means for immovably holding a stack of paper material while the same is being trimmed by said knife means, a feed table, a reciprocable feed carriage mounted on said table for feeding stacks of paper material successively into clamping relation with said clamp means, power driven means for reciprocating said carriage, mechanism including a slip clutch and a feed bar slidably mounted on said table and operably coupled with said carriage for drivably connecting said power driven means with said carriage, stop engaging means on said bar, and a stop element arranged to be engaged by said stop engaging means for stopping said mechanism and said carriage independently of said power driven means when each stack advanced thereby is disposed in clamping relation with said clamp means.

4. A machine as defined in claim 3, comprising yieldable means separate from said stop element and arranged to be engaged by said stop engaging means for checking the movement of said mechanism and said carriage as said stop engaging means approaches said stop element to cause said stop engaging means to gently engage said stop element.

5. In a machine of the character described having movable knife means and movable clamp means for immovably holding a stack of paper material while the same is being trimmed by said knife means, a feed table, a reciprocable feed carriage mounted on said table for feeding stacks of paper material successively into clamping relation with said clamp means, a reversible electric motor, mechanism including a slip clutch and a reciprocable member for drivably connecting said motor with said carriage, means for supplying current to said motor and comprising a circuit therefor, a switch in said circuit for closing it to thereby start said motor in one direction and effect movement of said carriage and each stack toward said clamp means, stop engaging means on said member, a stop element arranged to be engaged by said stop engaging means for stopping said mechanism and said carriage independently of said motor when each stack advanced thereby is disposed in clamping relation with said clamp means, a second switch in said circuit for breaking it to thereby stop said motor, and a third switch in said circuit for closing it to thereby start said motor in the reverse direction and effect return movement of said carriage away from said clamp means.

6. A machine as defined in claim 5, comprising means for checking the movement of said mechanism and said carriage as said stop engaging means approaches said stop element to cause said stop engaging means to gently engage said stop element.

7. In a machine of the character described having movable knife means, movable clamp means for immovably holding a stack of paper material while the same is being trimmed by said knife means, and mechanism for operating said clamp means, a stationary feed table spaced below and extending rearwardly beyond said clamp means and said knife means, reciprocable stack feeding means associated with said table and constructed and arranged to engage the rear faces of stacks of paper material resting on said table and push said stacks relative to said table successively into clamping relation with said clamp means, power operated means for reciprocating said stack feeding means, means for causing the movement of said stack feeding means and a stack engaged thereby by said power operated means toward said clamp means, and means actuated by said clamping mechanism when said clamp means is engaged with a stack delivered thereto by said carriage for causing the movement of said stack feeding means by said power operated means relative to said table and the clamped stack away from said clamp means.

8. In a machine of the character described having movable knife means, movable clamp means for immovably holding a stack of paper material while the same is being trimmed by said knife means, and mechanism for operating said clamp means and including a driven shaft having a cam thereon, reciprocable stack feeding means for feeding stacks of paper material successively into clamping relation with said clamp means, means including a reversible electric motor for reciprocating said stack feeding means, switch means for controlling said motor and movement of said stack feeding means and each stack toward said clamp means, and other switch means actuated by said clamp cam for reversing said motor and causing return movement of said stack feeding means away from said clamp means.

9. In a machine of the character described, reciprocable stack feeding means, mechanism for reciprocating said stack feeding means and including a slip clutch and a reciprocable bar having a stop engaging member thereon, stack clamping and trimming means to which stacks of paper material are delivered successively by said stack feeding means, mechanism for operating said stack clamping and trimming means and including a driven element and a clutch adapted to connect and disconnect said element relative to said stack clamping and trimming means, a stop element arranged to be engaged by said stop engaging member for stopping said bar and said stack feeding means when each stack advanced thereby reaches clamping and trimming position, a lever actuated by said stop engaging member, check means engaged by said lever for retarding the movement of said bar and said stack feeding means as said stop engaging member approaches said stop element, and devices operated by said lever and actuating said last-named clutch so that said stack clamping and trimming means are actuated to clamp and trim each stack delivered thereto by said stack feeding means.

10. In a machine of the character described, a stationary feed table, a reciprocable feed carriage mounted on said table and having an upstanding surface arranged to engage the rear face of a stack of paper material resting on said table and push said stack along said table from a receiving position on said table to a working position, means for reciprocating said carriage, a clamp movably mounted on said carriage to engage the top of the stack and yieldingly press the same against said table thereby holding said stack against displacement relative to said carriage during movement thereof, actuating means on said carriage and connected with said clamp, spring means on said carriage and connected to said actuating means for moving said clamp into engagement with the stack, abutment means arranged to be engaged by said actuating means during each return movement of said carriage and as the latter approaches and moves to the aforesaid receiving position, engagement of said actuating means with said abutment means effecting operation of said actuating means and movement of said clamp thereby to an inoperative stack clearing position, and means for moving said abutment means away from said actuating means to permit operation of the latter by said spring means and movement of said clamp thereby into operative stack engaging position.

11. In a machine of the character described, a feed table, a reciprocable feed carriage mounted on said table for feeding stacks of paper material successively from a receiving position on said table to a working position, means for reciprocating said carriage, a clamp movably mounted on said carriage for holding each stack against displacement relative to said carriage during movement thereof, clamp actuating means on said carriage, spring means on said carriage and connected to said clamp actuating means for moving said clamp into engagement with each stack, a finger forming part of said clamp actuating means and projecting therefrom, an abutment member arranged to be engaged by said finger during each return movement of said carriage and as the latter approaches and moves to the aforesaid receiving position, engagement of said finger with said abutment member resulting in operation of said clamp actuating means and movement of said clamp thereby to an inoperative stack clearing position, means for supporting said abutment member, and manually actuated means operatively connected to said abutment member supporting means for operating the latter to move said abutment member away from said finger and thereby permit operation of said clamp actuating means by said spring means and movement of said clamp into operative engagement with each stack.

12. In a machine of the character described, a feed table, a reciprocable feed carriage mounted on said table for feeding stacks of paper material successively from a receiving position on said table to a working position, means for reciprocating said carriage, a clamp movably mounted on said carriage for holding each stack against displacement relative to said carriage during movement thereof, clamp actuating means on said carriage, spring means on said carriage and connected with said clamp actuating means for moving said clamp into engagement with each stack, a finger forming part of said clamp actuating means, an abutment member arranged to be engaged by said finger during each return movement of said carriage and as the latter approaches and moves to the aforesaid receiving position, engagement of said finger with said abutment member effecting operation of said clamp actuating means and movement of said clamp thereby to an inoperative stack clearing position, a movable support for said abutment member, a foot pedal, and connections between said foot pedal and said support for operating the latter when said foot pedal is depressed to move said abutment member away from said finger and thereby permit operation of said clamp actuating means by said spring means and movement of said clamp into operative engagement with each stack.

13. In a machine of the character described, a feed table, a reciprocable feed carriage mounted on said table for feeding stacks of paper material successively from a receiving position on said table to a working position, means for reciprocating said carriage and including an electric motor, normally open switch means for controlling the starting of said motor and movement of said carriage and each stack thereby toward said working position, a movable clamp on said carriage for holding each stack against displacement relative to said carriage during forward movement thereof, clamp actuating means on said carriage, spring means on said carriage and connected to said clamp actuating means for moving said clamp into engagement with each stack, abutment means arranged to be engaged by said clamp actuating means during each return movement of said carriage and as the latter approaches and moves to the aforesaid receiving position, engagement of said clamp actuating means with said abutment means effecting operation of said clamp actuating means and movement of said clamp thereby to an inoperative stack clearing position, said abutment means when moved away from said clamp actuating means permitting operation of the latter by said spring means and movement of said clamp thereby into engagement with the stack to be fed, and means moving said abutment means away from said clamp actuating means and closing said switch means when said clamp actuating means is fully released by said abutment means and said clamp is engaged with the stack to be fed.

14. In a machine of the character described, a feed table, a reciprocable feed carriage mounted on said table for feeding stacks of paper material successively from a receiving position on said table to a working position, means for reciprocating said carriage and including an electric motor, means for supplying current to said motor and comprising a circuit therefor, switch means in said circuit for closing it to thereby start said motor and effect movement of said carriage and each stack toward said working position, other switch means in said circuit for holding it open to thereby prevent starting of said motor by said first-named switch means, a movable clamp on said carriage for holding each stack against displacement relative to said carriage during movement thereof, clamp actuating means on said carriage, spring means on said carriage and connected to said clamp actuating means for moving said clamp into engagement with each stack, abutment means arranged to be engaged by said clamp actuating means during each return movement of said carriage and as the latter approaches and moves to the aforesaid receiving position, engagement of said clamp actuating means with said abutment means effecting operation of said clamp actuating means and movement of said clamp thereby to an inoperative stack clearing position, said abutment means when moved away from said clamp actuating means permitting operation of the latter by said spring means and movement of said clamp thereby into engagement with the stack to be fed, and means for moving said abutment means away from said clamp actuating means and for actuating said other switch means when said clamp is engaged with the stack to be fed to thereby close said circuit and enable starting of said motor by said first-named switch means.

15. In a machine of the character described having a frame, a cutting bed on said frame, and knife means movable on said frame for trimming stacks of paper material successively positioned on said bed in cutting relation with said knife means, a delivery conveyor including a driven endless belt or apron extending forwardly of said bed for receiving the trimmed stacks successively discharged from said bed and further conveying the same, roller means on said frame for supporting the rear end portion of said delivery conveyor, a stand pivotally connected to said delivery conveyor and to the machine foundation for supporting the front end portion of said delivery conveyor, said roller means and said stand providing for sliding movement of said delivery conveyor bodily toward and away from said bed to operative and inoperative positions, respectively, an electric motor mounted on and movable with said delivery conveyor for driving said belt, and manually actuated means for moving said delivery conveyor to operative and inoperative positions the latter position allowing access to said knife means, said manually actuated means comprising a rock shaft journalled on said frame and extending transversely of said delivery conveyor, toggle means operatively connecting said shaft with said delivery conveyor, a handle on said shaft for rocking the latter in one direction to move said delivery conveyor toward said bed to said operative position and in the opposite direction to move said delivery conveyor away from said bed to said inoperative position, and a spring-pressed plunger on said handle and engageable in spaced openings in said frame for holding said delivery conveyor in said operative and inoperative positions.

16. In a machine of the character described, a cutting bed, a feed table adjacent one extremity of said bed, a delivery conveyor adjacent the opposite extremity of said bed, stack feeding means for feeding undivided stacks of paper material successively along said table and onto said bed, a pair of transversely spaced parallel side knives movable simultaneously toward said bed, one of said knives being adapted to divide each stack into two stack sections on the side trim line of one of said stack sections, and other of said knives being adapted to trim the said one stack section at the opposite side thereof, a front knife movable toward said bed and capable of trimming both said stack sections at the front thereof, pusher means normally disposed above the level of the top of each stack on said bed and movable rearwardly toward said stack and downwardly toward said bed to engage the other of said stack sections on said bed and move the same rearwardly out of cutting relation with said front knife so that the side trimmed stack section only of each stack is trimmed by said front knife, means for advancing and retracting said jusher means in timed relation with said knives, and means for lowering and raising said pusher means during advancing and retracting movements thereof, respectively, each succeeding undivided stack being adapted through movement thereof into cutting and trimming position to discharge both stack sections of each preceding stack from said bed beneath the raised and retracted pusher means and onto said delivery conveyor.

17. A machine as defined in claim 16, comprising means for preventing operation of said pusher means and for locking the same in its normal raised and retracted positions.

18. In a machine of the character described, a cutting bed, stack feeding means for feeding undivided stacks of paper material successively onto said bed, a pair of transversely spaced parallel side knives movable simultaneously toward said bed, one of said knives being adapted to divide each stack into two sections on the side trim line of one of said sections, and the other of said knives being adapted to trim the said one section at the opposite side thereof, a front knife movable toward said bed and capable of trimming both said sections at the front thereof, and means for moving the other of said sections on said bed rearwardly out of cutting relation with said front knife so that the side trimmed sections only of each stack is trimmed by said front knife, said last-named means comprising spaced upper and lower track bars arranged at one side and forwardly of said front knife, said lower bar projecting laterally beyond said upper bar and having formed in the upper surface thereof a cam track tapering downwardly and rearwardly therefrom, a slide block supported by said bars for sliding movement in a longitudinal direction, an arm mounted on said block for pivotal movement about a horizontal transverse axis and extending rearwardly therefrom, a stack engaging pusher carried by said arm and extending transversely thereof, a roller on said arm and adapted to engage said track bar surface and said cam track, resilient means for yieldingly urging said arm toward said lower track bar, said block being normally disposed in retracted position with said pusher spaced forwardly of said front knife and said roller being normally engaged with said track bar surface to dispose the retracted pusher above the level of the top of the stack on said bed, a lever operatively connected to said block, a spring for operating said lever in one direction to move said pusher rearwardly and downwardly beneath the front knife into operative engagement with the other of said stack sections on said bed, and a cam for operating said lever in the opposite direction to move said pusher forwardly and upwardly and return the same to its raised and retracted positions.

19. A machine as defined in claim 18, comprising releasable means engageable with said lever for preventing operation of said pusher by said spring and for locking said pusher in its normal raised and retracted positions.

20. In a machine of the character described, a feed table, a reciprocable feed carriage mounted on said table for feeding stacks of paper material successively from a receiving position on said table to a working position, power driven mechanism operatively connected to said feed carriage and imparting reciprocating motion thereto, a clamp movably mounted on said carriage for holding each stack against displacement relative to said carriage during forward movement thereof to said working position, actuating means on said carriage and connected with said clamp, spring means on said carriage and connected with said actuating means and acting to yieldingly urge said clamp into engagement with each stack, and abutment means arranged to be engaged by said actuating means during each return movement of said carriage and as the latter approaches and moves to the aforesaid receiving position and to be disengaged by said actuating means upon each forward movement of said carriage away from said receiving position, engagement of said actuating means with said abutment means effecting operation of said actuating means and movement of said clamp thereby to an inoperative stack clearing position in opposition to said spring means and disengagement of said actuating means from said abutment means enabling operation of said actuating means by said spring means and movement of said clamp thereby into operative engagement with each stack.

21. In a machine of the character described having movable knife means, movable clamp means at said knife means for immovably holding a stack of paper material while the same is being cut by said knife means, a source of power, and mechanism operably coupled with said clamp means and actuated by said source of power for operating said clamp means, the combination of a stationary feed table spaced below and extending rearwardly of said clamp means and said knife means, a reciprocable feed carriage mounted on said table and having an upstanding surface contacting the rear face of a stack of material resting on said table, a separate source of power, mechanism operably coupled with said carriage and said separate source of power, manually actuated means causing the operation of said last-named mechanism by said separate source of power and movement of said carriage and the stack engaged thereby relative to said table toward said clamp means and said knife means until said stack is disposed in clamping and cutting relation with said clamp means and said knife means, respectively, and means responsive to the operation of said first-named mechanism when said clamp means is engaged with said stack for causing the operation of said last-named mechanism by said separate source of power and movement of said carriage relative to said table and the clamped stack away from said clamp means.

References Cited in the file of this patent

UNITED STATES PATENTS

| Number | Name | Date |
|---|---|---|
| 758,156 | Taylor | Apr. 26, 1904 |
| 921,861 | Matthiessen | May 18, 1909 |
| 1,050,400 | Steele | Jan. 14, 1913 |
| 1,332,912 | Mitchell et al. | Mar. 9, 1920 |
| 1,577,644 | Juengst | Mar. 23, 1926 |
| 1,620,354 | Jones | Mar. 8, 1927 |
| 1,887,645 | Johnson | Nov. 15, 1932 |
| 1,892,327 | Buccicone | Dec. 27, 1932 |
| 1,955,671 | Coyle | Apr. 17, 1934 |
| 1,982,880 | Pachter | Dec. 4, 1934 |
| 2,003,027 | Wright | May 28, 1935 |
| 2,005,824 | Haumann | June 25, 1935 |
| 2,017,462 | Kleineberg | Oct. 15, 1935 |
| 2,123,487 | Parker | July 12, 1938 |
| 2,126,478 | Landrock et al. | Aug. 9, 1938 |
| 2,168,415 | Laukhuff | Aug. 8, 1939 |
| 2,176,543 | Norton | Oct. 17, 1939 |
| 2,199,708 | Maxfield | May 7, 1940 |
| 2,311,452 | Maurer | Feb. 16, 1943 |
| 2,322,294 | Heyman | June 22, 1943 |
| 2,353,405 | King | July 11, 1944 |
| 2,379,682 | Colucci et al. | July 3, 1945 |
| 2,406,508 | Papsdorf | Aug. 27, 1946 |
| 2,482,685 | Moyer | Sept. 20, 1949 |
| 2,562,938 | Moyer | Aug. 7, 1951 |
| 2,562,950 | Roessl | Aug. 7, 1951 |
| 2,566,243 | Nyquist | Aug. 28, 1951 |